(12) United States Patent
Trevers et al.

(10) Patent No.: US 7,010,046 B2
(45) Date of Patent: Mar. 7, 2006

(54) METHOD AND/OR ARCHITECTURE FOR IMPLEMENTING MPEG FRAME DISPLAY USING FOUR FRAME STORES

(75) Inventors: Gareth D. Trevers, San Jose, CA (US); Brett J. Grandbois, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 478 days.

(21) Appl. No.: 10/137,015

(22) Filed: May 2, 2002

(65) Prior Publication Data
US 2003/0206228 A1    Nov. 6, 2003

(51) Int. Cl.
*H04B 1/66* (2006.01)

(52) U.S. Cl. .................................. 375/240.29
(58) Field of Classification Search ................
375/240.01–240.29, 270.29; 345/531, 582; 714/781; H04B 1/66
See application file for complete search history.

(56) References Cited

U.S. PATENT DOCUMENTS

| 5,854,799 A * | 12/1998 | Okada et al. ............... 714/781 |
| 5,909,224 A * | 6/1999 | Fung ........................... 345/531 |
| 6,118,491 A | 9/2000 | Wu et al. .................... 348/526 |
| 6,519,286 B1 * | 2/2003 | Porter et al. ........... 375/240.13 |
| 6,538,658 B1 * | 3/2003 | Herrera ...................... 345/582 |
| 2002/0097797 A1 * | 7/2002 | Sugiyama ................ 375/240.1 |
| 2003/0012284 A1 * | 1/2003 | Kazayama et al. .... 375/240.25 |

\* cited by examiner

*Primary Examiner*—Tung Vo
(74) *Attorney, Agent, or Firm*—Christopher P. Maiorana, P.C.

(57) ABSTRACT

An apparatus comprising a decode frame store, a B frame store, a first anchor frame store, and a second anchor frame store. The decode frame store may be configured to decode one or more free frames and generate one or more B video images and one or more anchor video images. The B frame store may be configured to receive the one or more B video images from the decode frame store. The first anchor frame store may be configured to receive the one or more anchor video images from the decode frame store. The second anchor frame store may be configured to receive the one or more anchor video images from the first anchor frame store.

17 Claims, 9 Drawing Sheets

METHOD AND/OR ARCHITECTURE FOR IMPLEMENTING MPEG FRAME DISPLAY USING FOUR FRAME STORES

FIELD OF THE INVENTION

The present invention relates to a method and/or architecture for implementing MPEG frame displays generally and, more particularly, to a method and/or architecture for implementing MPEG frame displays using four frame stores.

BACKGROUND OF THE INVENTION

Conventional Motion Picture Expert Group (MPEG) video display systems implement three areas of memory to store picture data (or images) for decoding and displaying called frame stores. However, in some cases the three frame store video display implementations do not provide sufficient time to perform additional graphics manipulation after the picture data has been decoded. Additional time is needed to perform post-decode graphic manipulation in conventional video display systems.

To perform post-decode graphic manipulation, conventional video display systems (i) implement faster graphics mixing systems, (ii) only apply graphics mixing in certain cases where sufficient time is guaranteed, and/or (iii) reduce and/or limit the amount of graphics mixing performed. Conventional video display systems (i) are implemented with a much faster (and hence more expensive) graphics post-processing system, and/or (ii) limit the features that can be added to the system.

Furthermore, arbitrary vertical scaling is desired by a number of users. Arbitrary vertical scaling can provide (i) a feature for differentiation among set-top box (STB) vendors and (ii) a better user experience. However, vertical scaling is constrained in three frame video display methods and/or architectures since three frame video displays decode and display simultaneously out of the same frame store under certain conditions without decode overwriting display (i.e., the picture will not have been fully decoded before it is displayed). Simultaneous decode and display out of the same frame store forces the decode to run more slowly and results in video tears as downscaling increases.

A conventional Motion Picture Expert Group (MPEG) decode system is implemented having three frame stores. Two frame stores are configured to store the forward and backward anchor frames (e.g., reference pictures) and the third store is configured to store the B frame. The B frame store is configured to receive information copied from the forward and backward anchor frames. Conventional video decoders are implemented having three frame stores since three stores is the minimum number of stores to perform conventional decode processes. Since a conventional video decoder system displays the B frame store as the B frame is decoded, extensive graphics manipulation is difficult and/or expensive to implement via a conventional video decoder system.

It would be desirable to have an video image display that (i) provides additional graphics manipulation after the picture has been decoded and (ii) does not limit the features that can be added.

SUMMARY OF THE INVENTION

The present invention concerns an apparatus comprising a decode frame store, a B frame store, a first anchor frame store, and a second anchor frame store. The decode frame store may be configured to decode one or more free frames and generate one or more B video images and one or more anchor video images. The B frame store may be configured to receive the one or more B video images from the decode frame store. The first anchor frame store may be configured to receive the one or more anchor video images from the decode frame store. The second anchor frame store may be configured to receive the one or more anchor video images from the first anchor frame store.

The objects, features and advantages of the present invention include providing a method and/or architecture for a multi-frame video display system that may (i) operate exclusively in a four frame mode in a preferred embodiment, (ii) alternate operation between a four frame mode and a three frame mode in an alternative embodiment, (iii) support arbitrary vertical scaling, (iv) perform various additional graphics manipulations after the picture has been decoded, (v) provide a fourth frame store to eliminate the constraint of decoding and displaying from the same frame store simultaneously, (vi) override the microcode engine that generally controls decode and display of the automatic display management system and the automatic decode management system via existing commands (e.g., display override, rip forward, etc.), (vii) provide a modular implementation, (viii) be simple to port, (ix) be easily understood by typical users, (x) be tested extensively, (xi) be extendable to incorporate manual three frame decode, (xii) be implemented with full feature availability and support (e.g., horizontal pan scan, pulldown, channel change, picture insertion, display override, rip forward, etc.), (xiii) be fault tolerant and stable, (xiv) provide 100% performance under normal conditions and concealment and recovery under abnormal conditions such as underflow, bitstream errors, etc., (xv) provide monitoring facilities, (xvi) provide error traps, (xvii) be developed rapidly and marketed quickly, (xviii) be transparent to the application, (xix) provide easy mapping of primitive commands, (xx) implement a core running in a background and a set of overridden primitive commands configured to manipulate the core, (xxi) be compatible with a number of decoder drivers via hooks, (xxii) provide post-decode graphics engines that may be implemented to complete any processing and/or effects that are desired before the picture data (image) is displayed on a monitor, and/or (xxiii) be scaled to hold any number of decoded pictures (e.g., implemented with any appropriate number of unused frame and decode stores) to provide sufficient time for slower post-decode graphics engines to perform.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
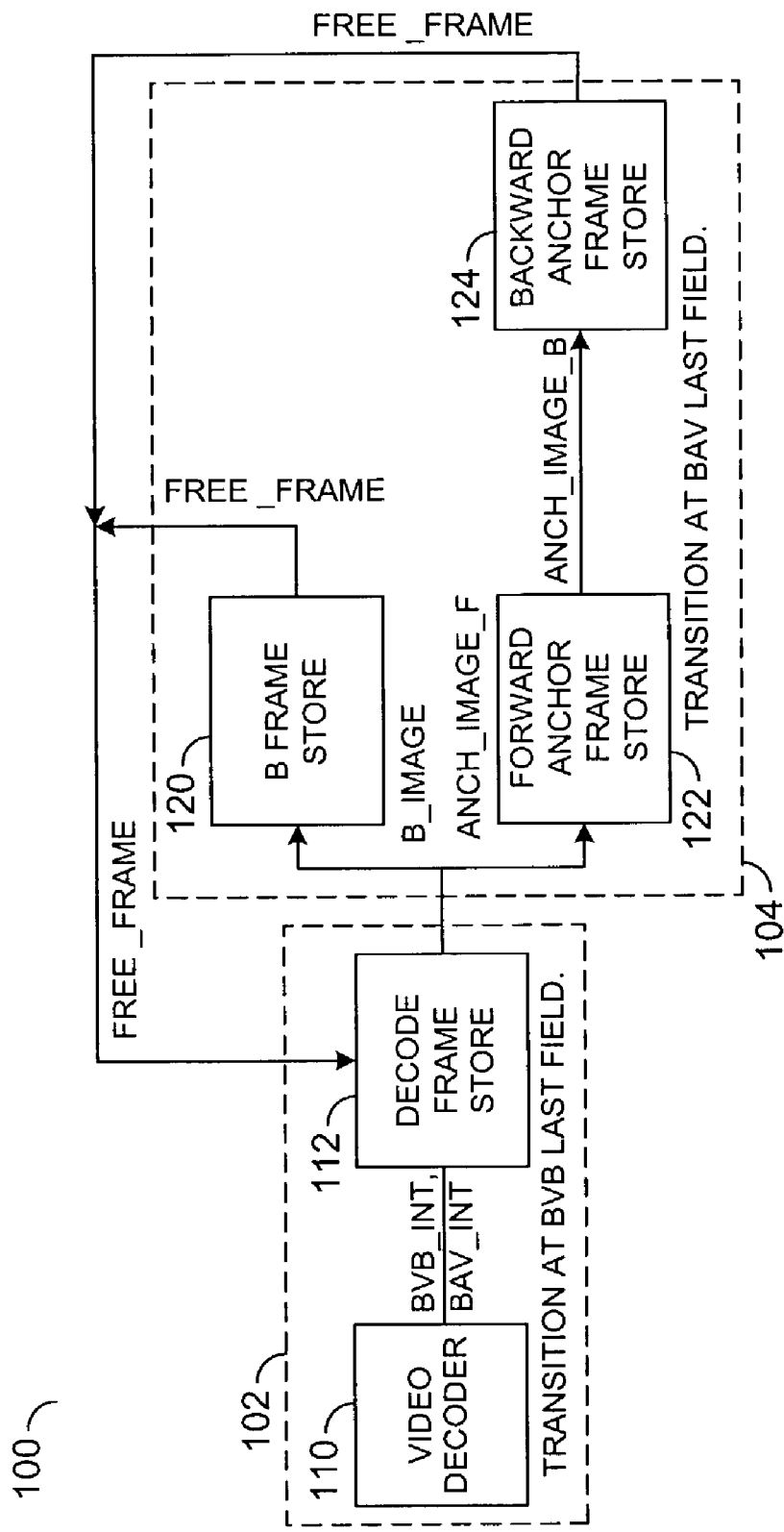
FIG. 1 is a flow diagram of a preferred embodiment in accordance with the present invention.

Referring to FIG. 1, a flow diagram illustrating a method 100 is shown in accordance with a preferred embodiment of the present invention. The method (or system, process, operation, routine, mechanism, instruction set, engine, etc.) 100 may be implemented as a complete video frame display via a plurality of frame stores. In one example, the process 100 may be compliant to a MPEG standard (or specification) such as ISO/IEC standard 11172 and/or ISO/IEC standard 13818. However, the system 100 may be configured to be compliant to any appropriate standard to meet the design criteria of a particular application.

The present invention generally provides a fourth frame store. The fourth frame store may be configured as (i) two First In/First Out (FIFO) memories of free (e.g., unused) and decoded frame stores that may be implemented as pools (e.g., buffer memories, temporary storage, etc.) and (ii) a currently decoding frame store serially coupled between the FIFO memories. The fourth frame store may be configured to provide a store in which to decode pictures. A display process section of the present invention may be configured to display the picture at a predetermined time (e.g., audio/video synchronization may be maintained).

The process 100 may be configured to control a picture decode and display via an implementation of four or more frame stores. In a preferred embodiment, the process 100 may be implemented having four frame stores. The process 100 may be implemented as a four frame decode/display (FFD) system. However, the method 100 may be implemented having greater than four stores to meet the design criteria of a particular application. The process 100 may be configured to maintain audio/video synchronization.

In one example, the process 100 may be implemented such that the decode and display processes generally do not operate out of the same frame store simultaneously. The system 100 may be implemented as a software driver that is configured to override control of decode/display processes from the video core.

The FFD engine 100 may be configured to ensure that the frame store currently being decoded into is generally not the same frame store that is currently being displayed. The system 100 is generally implemented as four frame store buffers in the video core buffer memory (not shown). Two frame store buffers may be configured to hold the anchor frames for the forward and backward predictions, respectively. One frame store may be configured to hold the current B frame being displayed and one frame store may be configured to hold the frame currently being decoded. The frame stores are generally assigned and released at specific points by the FFD engine 100.

The method 100 generally comprises a state (or block, circuit etc.) 102 and a state (or block, circuit, etc.) 104. The block 102 generally corresponds to a transition point at a Begin Vertical Blanking (BVB) last field. The block 104 generally corresponds to a transition point at a Begin Active Video (BAV) last field.

The block 102 generally comprises a block (or circuit) 110 coupled in series with a block (or circuit) 112. The circuit 110 may be implemented as a video decoder. The circuit 110 is generally implemented as an MPEG compliant video decoder. In one example, the process 100 may be implemented in connection with a video decoder 110 such as an LSI Logic Corporation SC2000 set-top-box (STB) video decoder. In another example, the method 100 may be implemented in connection with an LSI Logic Corporation L6402x series STB video decoder. In yet other examples, the system 100 may be implemented in connection with video decoders produced by other manufacturers (e.g., ST Microelectronics, NEC Corporation, ATI Technologies, Inc., Broadcom Corporation, Conexant Systems, Inc., Microsoft Corporation, etc.). However, the system 100 may be implemented in connection with any appropriate video decoder (or video decoder driver) 110 (e.g., via hooks) to meet the design criteria of a particular application. The block 112 may be implemented as a fourth frame store.

The circuit 104 generally comprises a circuit (or block) 120, a circuit (or block) 122, and a circuit (or block) 124. The block (or circuit) 120 may be implemented as a B frame store circuit. The block (or circuit) 122 may be implemented as a forward anchor frame store circuit. The block (or circuit) 124 may be implemented as a backward anchor frame store circuit.

The decode and display system of the FFD engine 100 are generally synchronized to two specific points in time (i) the Begin Vertical Blanking (BVB) interval for the last field in a frame for decode start (e.g., the circuit 102) (ii) and the Begin Active Video (BAV) for display update (e.g., the circuit 104). A timeline for the system 100 may be implemented as the following sequence of steps:

1. A BVB for last field interrupt signal (e.g., BVB_INT) may be asserted by the video decoder 110 (e.g., the circuit 102). The FFD engine 100 may be configured to (i) allocate a free frame store (described in connection with FIG. 2) and (ii) set the free frame store as the current decode frame store. Decode of the free frame store frame will generally then proceed. Decode is generally performed via one or more decode engines (not shown) within the decoder 110. The block 102 may be configured to receive one or more signals (frames) (e.g., FREE_FRAME), decode the frame FREE_FRAME, and generate one or more video images (e.g., B_IMAGE and ANCH_IMAGE).

The frames FREE_FRAME are generally frames that are yet to be decoded and have a respective video image generated. In one example, the signal FREE_FRAME may be a previously displayed frame that has been presented to the block 102 from the block 104. In another example, the signal (frame) FREE_FRAME may be a frame that corresponds to an incoming bitstream (not shown). The signal (frame) B_IMAGE may be implemented as one or more MPEG compliant B (e.g., bidirectional) video images. The signal (frame) ANCH_IMAGE may be implemented as one or more MPEG compliant anchor video images (e.g., I, P, etc.). The anchor video image ANCH_IMAGE is generally implemented as (i) a forward anchor image (e.g., ANCH_IMAGE_F) and (ii) a backward anchor image (e.g., ANCH_IMAGE_B). However, the signals FREE_FRAME, B_IMAGE and ANCH_IMAGE may be implemented as any appropriate signal (frame) type and/or protocol to meet the design criteria of a particular application.

2. A BAV for last field (of the next frame) interrupt signal (e.g., BAV_INT) is generally asserted by the video decoder 110. The FFD engine 100 generally sets up the current decode frame store (e.g., B_IMAGE or ANCH_IMAGE_B) as the next displayed frame. The video decoder 110 will generally sample the display update parameters at the change to first field of the next frame. While the display parameters are set up at the circuit 104, the display parameters generally do not actually take effect until the assertion of the following BVB interrupt BVB_INT.

3. Go to 1.

The display update system at the BAV (e.g., the block 104) may be configured to (i) move (transfer) the decode frame store (e.g., the signals B_IMAGE and ANCH_IMAGE_F) to the B frame store 120 or the anchor frame store 122, respectively, (ii) transfer the forward video image ANCH_IMAGE_F from the forward anchor frame store 122 to the backward anchor frame store 124 as the backward video image ANCH_IMAGE_B, and (iii) release any unused frame stores (e.g., the signal FREE_FRAME) back into the unused pool (described in connection with FIG. 2) in the decode frame store 112. The decode system 100 may be configured to allocate an unused frame store from the unused pool and start the decode process (e.g., the block 102).

In one example, the blocks (circuits) 102 and 104 may comprise a four frame decoder system in response to one or more commands presented by the decoder 110. In another example, the blocks 102 and 104 may comprise a three frame decoder system in response to one or more commands presented by the decoder 110. When the system 100 is configured to operate as a three frame decoder, the decode process is generally performed via the decoder 110 in connection with the B frame store 120.

Figure 2:
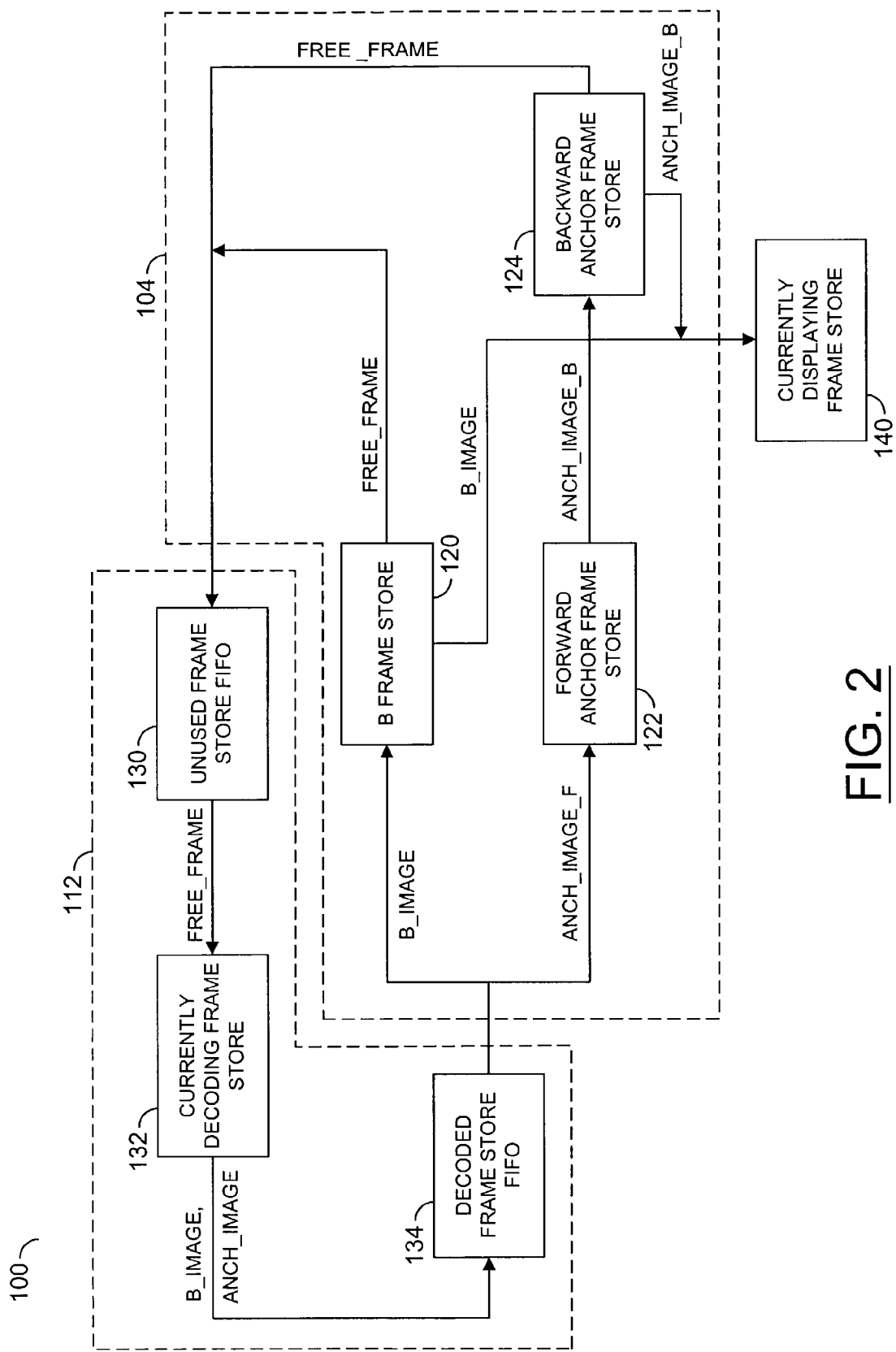
FIG. 2 is another flow diagram in accordance with the present invention.

Referring to FIG. 2, another flow diagram of the process 100 in accordance with the present invention is shown. The block (or circuit) 112 generally comprises a circuit (or block) 130, a circuit (or block) 132, and a circuit (or block) 134. The circuit (or block) 130 may be implemented as the free frame store pool. The block (or circuit) 130 may be implemented as one or more first-in/first-out (FIFO) memory circuits. The block (or circuit) 132 may be implemented as a current decode frame circuit. The block (or circuit) 132 may be implemented as a currently decoding frame store. The block (or circuit) 134 may be implemented as one or more FIFO memory circuits. The block 134 may be implemented as the decoded frame pool. One or more decode engines (not shown) are generally coupled to the block 132. The decode engine may be implemented in connection with the video decoder 110. The system 100 also may comprise a circuit (or block) 140. The block (or circuit) 140 may be implemented as a current display circuit (or frame store).

The method 100 may be implemented, in one example, via the following sequence of steps:

1. The decoder 110 may be configured to indicate a new picture is ready to be decoded (e.g, the signals BVB_INT and/or BAV_INT may be asserted).

2. The system 100 may receive a free frame store FREE_FRAME from the free frame store pool 130 and assign the picture to be decoded to the frame store 132. The frame store 132 may be assigned to the currently decoding frame store pointer.

3. The decoder system 100 may be configured to wait for the picture to be decoded (generated) at the circuit 132. The picture is generally decoded (and/or post-decode processed) in a single frame time period or less.

4. When the picture is fully decoded (e.g., when the video images B_IMAGE and/or ANCH_IMAGE_F are generated in response to the frame FREE_FRAME) via the block 132, the respective frame store B_IMAGE and/or ANCH_IMAGE_F may be transferred to the decoded frame pool at the circuit 134.

The following steps may occur at the start of the next picture display cycle:

5. The system 100 may be configured to retrieve next decoded frame B_IMAGE and/or ANCH_IMAGE_F from the decoded frame pool 134.

6. When the picture that is retrieved from the decoded frame pool 134 is a B frame video image (e.g., the signal B_IMAGE) the signal is presented to the B frame store 120 and the picture is generally immediately displayed (e.g., via the circuit or block 140). The previous B frame store B_IMAGE may be transferred (from the circuit 120) to the free frame store pool 130 (e.g., as the signal FREE_FRAME).

7. When the picture that is retrieved from the decoded frame pool 134 is an anchor frame (e.g., the signal ANCH_IMAGE_F), the picture may be presented to the forward anchor pointer (e.g., the circuit or block 122). The previous forward anchor pointer (e.g., the previous circuit 122 video image ANCH_IMAGE_F) may be assigned to (e.g., transferred to) the backward anchor pointer (e.g., the circuit or block 124 video image ANCH_IMAGE_B) and immediately displayed via the block 140. The previous backward anchor pointer 124 video image ANCH_IMAGE_B may be assigned (e.g., presented) from the circuit 124 to the free frame store pool 130 (e.g., as the signal FREE_FRAME).

8. The sequence implemented via the system 100 may be configured to return to step 1.

The unused frame store 130 may be configured to contain references to all unallocated frame stores FREE_FRAME. When a frame is generally available to be decoded, the next unused frame FREE_FRAME may be transferred from the store 130 and presented to the currently decoding frame store 132.

The currently decoding frame store 132 may be configured to contain a reference to the frame store where the system 100 is currently decoding. The frame that is being decoded in the currently decoding frame store 132 may be generated as an anchor frame ANCH_IMAGE or a B frame B_IMAGE. When a frame store contains an essentially empty value (e.g., NULL), generally no frame store has been assigned. When a frame store contains a value (e.g., X), the frame store may be any value and/or the value does not matter. The decode process (routine, method, etc.) implemented via the block 112 (in connection with the one or more decode engines) may be configured to provide (i) frame decode, (ii) additional graphics, (iii) video scaling (e.g., arbitrary vertical/horizontal scaling), and/or (iv) post-decode display controller (not shown) processes.

The B frame 120 may be configured to contain a reference to a previously decoded B frame B_IMAGE that has been made available to display (e.g., available to the circuit 140). After a particular frame has been displayed (e.g., after the circuit 140), the frame is generally returned to the unused frame store 130 as the signal FREE_FRAME. A fully decoded B frame B_IMAGE is generally retrieved from the decoded frame store 134 and transferred (presented) to the B frame 120 when the previous current display frame 140 has been displayed. The transfer of a fully decoded frame B_IMAGE to the block (or circuit) 120 will generally result in the B frame 120 becoming the new current display frame 140. The current display frame 140 may be configured to contain a reference to the frame store that is currently being displayed. The currently displayed frame store 140 is generally implemented to display either the B frame 120 video image B_IMAGE or the backward anchor 124 video image ANCH_IMAGE_B.

The forward anchor 122 may be configured to contain a reference to the current forward anchor frame ANCH_IMAGE_F that is implemented to provide prediction of B frames and P frames. A fully decoded anchor frame video image ANCH_IMAGE is generally retrieved from the decoded frame store 134 and transferred (presented) to the forward anchor frame 122 when the current display frame 140 has been displayed. The transfer (presentation) from the decoded frame store 134 to the forward anchor frame 122 will generally result in the previous forward anchor frame 122 video image ANCH_IMAGE_F (i) being shifted into (e.g., transferred to, presented to) the backward anchor 124 as the video image ANCH_IMAGE_B and (ii) becoming (e.g., presented to) the current display frame 140. The backward anchor 124 may be configured to contain a reference to the current backward anchor frame video image ANCH_IMAGE_B that is implemented to provide the prediction of B frames. When the forward anchor 122 video image ANCH_IMAGE_F replaces the backward anchor 124 video image ANCH_IMAGE_B, the backward anchor 124 video image ANCH_IMAGE_B is generally transferred (e.g., presented) to the unused frame store 130 as the frame FREE_FRAME.

In one example, the current decode frame 112 and the forward anchor 122 may be configured to reference a NULL frame via a tag (e.g., NULL_FRAME, not shown) as well as a frame store. The tag NULL_FRAME may be configured to provide an indication to the display system (e.g., the decoder 110) where the method 100 is implemented that the video sequence is complete and that the remaining un-displayed anchor frame (e.g., the frame store 122 video image ANCH_IMAGE_F) may be transferred to the block 124 as the video image ANCH_IMAGE_B and displayed (e.g., via the circuit 140) at an appropriate point in time.

Similarly to the anchor frame 122 and 124 video images ANCH_IMAGE, the NULL frame tag NULL_FRAME is generally retrieved from (presented by) the decoded frame 134 and transferred to the forward anchor 122 when the current display frame 140 has been displayed. The transfer of the decoded frame 134 video image ANCH_IMAGE to the forward anchor 122 will generally result in the previous forward anchor frame 122 video image ANCH_IMAGE (i) being shifted into (e.g., transferred to, presented to) the backward anchor 124 and (ii) becoming (e.g., presented to) the current display frame 140. However, the tag NULL_FRAME is generally not shifted into (e.g., transferred to, presented to) the backward anchor 124. The tag NULL_FRAME is generally overwritten when the next anchor frame video image ANCH_IMAGE is transferred (e.g., received) from the decoded frame 134. The tag NULL_FRAME is generally (e.g., effectively) ignored when immediately followed by another picture ANCH_IMAGE since the following picture will generally force the display (e.g., the circuit 140) of the remaining undisplayed anchor frame 124 video image ANCH_IMAGE.

During the example of a linear play mode of the system 100, a new frame (e.g., a new frame B_IMAGE or ANCH_IMAGE_B available via the circuit 112) may be displayed at the start of every first field (not shown) via the block 140. However, when a frame is not available for display, the current frame 140 is generally repeated.

The routine 100 may be configured to provide trick modes of video display. The routine 100 is generally configured to mute the system audio during the trick modes. However, the routine 100 may be configured to provide audio/video synchronization in connection with the trick modes. In one example, the method 100 may be configured to provide a frame repeat mode of operation. During the frame repeat mode, the current display frame 140 may be repeatedly displayed according to any appropriate design criteria for the frame repeat mode application. The currently decoding frame store 132 may be configured to finish decoding and the decode routine will generally stall. Automatic regulation of decode may be demonstrated via stall of the decode.

In another example, frames may be skipped. The frames that may be skipped may be configured to include B frames that correspond to the video image B_IMAGE, anchor frames that correspond to the video image ANCH_IMAGE, PB frames, all frames, etc. During a skip mode of operation, when a frame is not available for display at the completion of the display of the current display frame 140, display of the current display frame 140 is generally repeated.

The system 100 may be configured to provide the addition of the block 112 (e.g., free frame store pool 130, the currently decoding frame store 132 and decoded frame store pool 134). The free frame store pool 130 and decoded frame store pool 132 may be configured to add delay time between the decode and video image generation (e.g., the circuit 132) and display (e.g., the circuit 140) of an MPEG picture. The four frame decode implemented via the method 100 may overcome deficiencies of the conventional method of decoding and displaying from the same frame store simultaneously. The routine 100 four frame decode may be implemented in connection with display override and rip forward (e.g., decode override) features (e.g., routines, commands, modes, etc.) that are generally resident in the decoder 110. The display override routine may be configured to provide override of the automatic display management system (not shown). The rip forward mode may be configured to override the automatic decode management system (not shown). In one example, the display override and rip forward features may be configured to override a microcode engine (not shown) that generally controls decode and display.

One or more post-decode graphics engines (not shown) may be implemented (e.g., coupled to the block 132) to complete any processing and/or effects that may be implemented before the picture data (image) is displayed on a monitor (not shown). In one example, the present invention may be implemented having four frames (e.g., as a four frame decoder). The system 100 is generally configured to provide sufficient time to generate an MPEG compliant image for display (e.g., via the block 140) during a single frame time period (or less time). However, the system 100 may be implemented having any appropriate type and/or speed of decode engines to provide sufficient time to perform special (trick) modes. In another example, the system 100 may be configured to alternate operation between (i) a three frame decode mode of operation (e.g., as a three frame decoder) during a normal decode process (mode) and (ii) a four (or more) frame decode mode of operation (e.g., as a four frame decoder) during one or more trick decode processes (modes).

The FFD engine 100 may be described in connection with a number of C programming operators (e.g., =, ==, ++, &&, !=, etc.). However, any appropriate command language and/or syntax may be implemented to meet the design criteria of a particular application. The FFD engine 100 may be configured to provide a high level of control (e.g., global enabling or disabling). To support cases where an application may be configured to switch in and out of three or four frame mode operations, a global control system is generally implemented in the system 100. Asserting a command FFDDisable( ) may isolate the driver 110 from the rest of the system 100. Application programming interface (API) routines may be executed normally in the system 100 (e.g., similar to a convention decoder design). However, all FFD 100 logic blocks (not shown) that access the decoder 110 registers (not shown) or manipulate control flags (not shown) that may be configured to manipulate registers are generally not entered. The application where the system 100 is implemented may be configured to operate without performing read or write operations from/to the decoder 110 registers. The system 100 may be configured to provide a control flag (e.g., EnableEngine) that may be set to logic TRUE (e.g., on or logic "1") via a command FFDEnable( ) and set to logic FALSE (e.g., off or logic "0") via the command FFDDisable( ). All API routine logic blocks (not shown) that interface with decoder 110 control are generally implemented via an if (EnableEngine==TRUE) clause (or command). The power-up default is generally EnableEngine=TRUE.

The FFD engine 100 may be configured to initialize via a call to a command FFDInit( ). The call to FFDInit( ) may self-position a pointer to an array of eight frame store start addresses (not shown). The frame store start addresses are generally start points of the luma and chroma buffers (not shown) for each frame store. The frame store addresses are generally formatted as values to be written in the decoder 110. As such, the frame store addresses are generally aligned on 64-byte boundaries (or any appropriate boundary to meet the design criteria of a particular application). The FFD engine 100 generally does not do any address conversion on the formatted values. The system 100 may be configured to assign the formatted addresses to different frame stores and write the values to the decoder 110 when the appropriate operation conditions are met. The command FFDInit( ) routine may be configured to force the decode system 100 to stop. In one example, a call to the command FFDStartDecode( ) may be implemented to start the decode/display process 100.

By default, the FFD engine 100 is generally configured to not start decode/display processing after a call to the commands FFDInit( ) or FFDResetDecode( ). To start the FFD engine 100 decode/display process, a call to the command FFDStartDecode( ) is generally made. For startup of the system 100, the following sequence of calls is generally made.

1. FFDEnable( );
2. FFDInit(frame_store_addresses);
3. FFDStartDecode( );

In one example, a basis of control in the decode process 100 may be the implementation of a rip forward (decode override) feature of the video decoder 110. When the rip forward mode is enabled, the video decoder 110 may be configured to not automatically decode pictures as pictures stream into the decoder 110. The decoder 110 may be configured to wait until a decode start command is received from the host CPU (not shown). The video decoder 110 may be configured to read header data until the first slice start code of a picture is read. At that point, the decoder 110 may halt until a picture decode or skip command is received from the host. The rip forward feature may provide the FFD engine 100 total control over skip and decode decisions. As such, the system 100 may be configured to manage the video system where the system 100 is implemented.

The FFD engine 100 is generally configured to access certain fields from the sequence/group of picture (GOP)/picture headers and extensions. When the application where the routine 100 is implemented has pulled out (e.g., retrieved) a header or extension from the AUX FIFO memory (not shown), the routine 100 generally formats the corresponding data and then may call a respective FFD header notification routine. For example, after the application where the routine 100 is implemented has retrieved a sequence header from the AUX FIFO memory, the routine 100 maybe configured to format a parameter (e.g., horizontal_size) and then call a command (e.g., FFDProcessSequenceHeader(horizontal_size)).

Internally, the FFD engine 100 may be implemented having two global storage structures for current sequence and picture information (e.g., CurrentSequenceHeader and CurrentPictureHeader, respectively). The global storage structures may be configured to be filled (loaded) with the most recent header information. The global storage structure may be referenced when the routine 100 makes decisions on whether or not to decode a picture. The FFD engine 100 may be configured to process all self-structure initialization at certain boundaries. For example, at a picture header boundary (e.g., when FFDProcessPictureHeader(temp$_{13}$ ref, coding_type) is called) the CurrentPictureHeader fields are generally set to MPEG1 defaults to be compliant with one or more MPEG standards when there are no following picture extensions.

When the process 100 receives the first slice start code in a new picture, the process 100 will generally halt at that point and assert a first slice start code detect interrupt. At the first slice start code detect interrupt, the application where the process 100 is implemented will generally assert a command (e.g., FFDProcessFirstSlice( )) to notify the FFD engine 100 that a new picture is waiting at the decoder 110. At this point the FFD engine 100 may be configured to decide whether the picture is to be skipped or held pending decode. If the picture is to be skipped, the picture is generally skipped at this point. If the picture is to be decoded, a global control flag (e.g., PictureAtDecoder) is generally set to TRUE. The control flag PictureAtDecoder may signal the FFD engine 100 to start the picture decode process at the next BVB interrupt in last field (e.g., the signal BVB_INT).

The FFD engine 100 may be configured to process in a format that comprises all header information parsed and presented in its entirety when the command FFDProcessFirstSlice( ) is called. The process 100 is generally configured to provide the information in the current state structures to process the skip/decode decision. As such, the application where the process 100 is implemented generally either calls the FFD header processor routines (i) as the headers are retrieved from the AUX FIFO memory or (ii) in the first slice interrupt service routine when the first slice interrupt is processed prior to calling the command FFDProcessFirstSlice( ).

Figure 3:
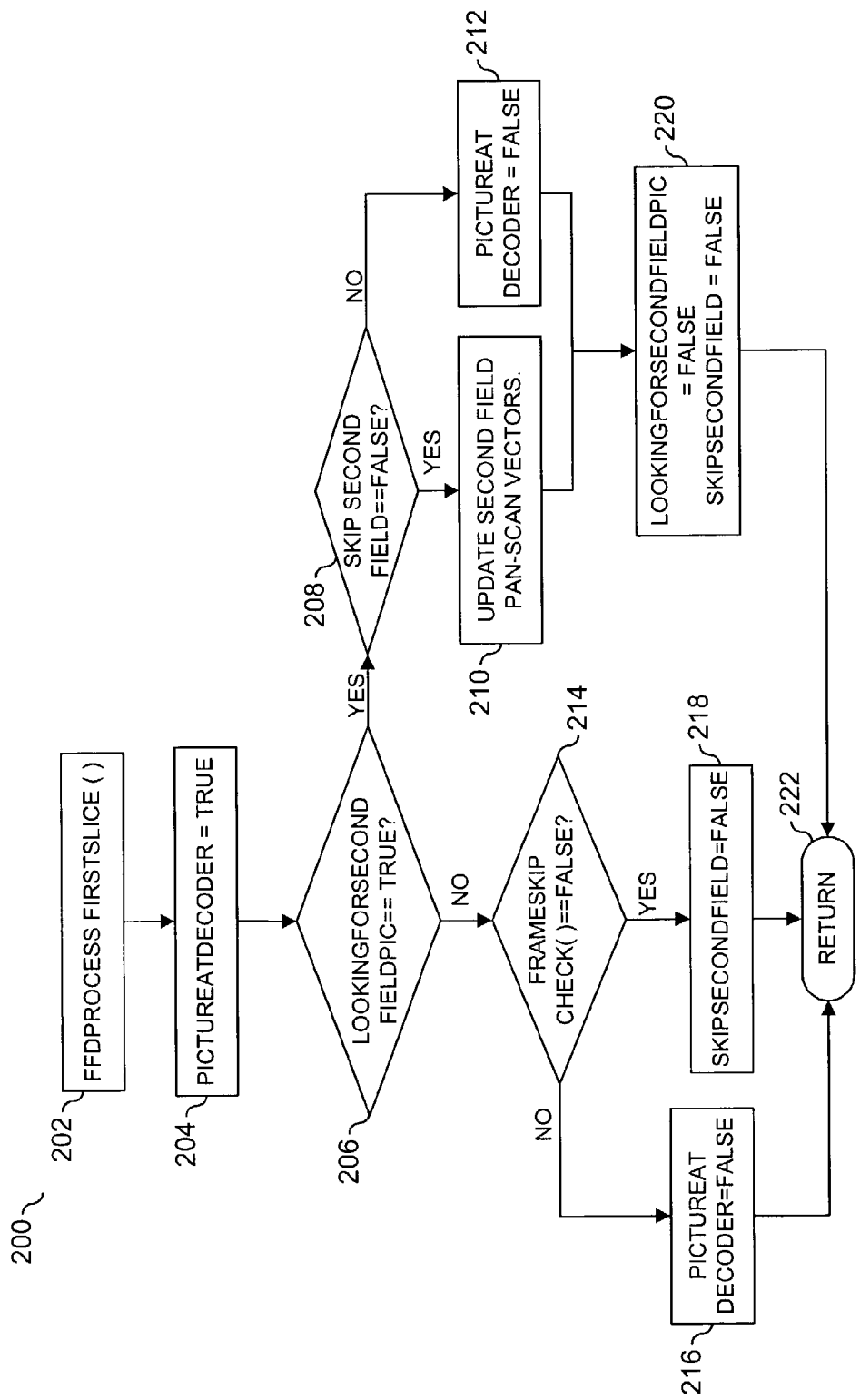
FIG. 3 is a flow diagram of a decision process in accordance with the present invention.

Referring to FIG. 3, a flow diagram 200 illustrating a decision process of the present invention is shown. The process (method, instruction set, routine, etc.) 200 may be implemented as a first slice decision tree. The process 200 may be configured to filter (differentiate) skipped pictures from pictures that are to be decoded (e.g., via the process 100). The method 200 generally comprises a state (or block) 202, a state (or block) 204, a decision state (or block) 206, a decision state (or block) 208, a state (or block) 210, a state (or block) 212, a decision state (or block) 214, a state (or block) 216, a state (or block) 218, a state (or block) 220, and a state (or block) 222.

The core process of the routine 200 (e.g., a command FFDProcessFirstSlice( )) may be configured to set the global control flag PictureAtDecoder to logic TRUE or FALSE. A value of TRUE may notify the FFD engine 100 that there is a picture waiting for a decode proceed command and the picture may be processed in the following BVB interrupt of the last field. A value of FALSE may notify the system 100 that the picture was skipped, either implicitly by the video decoder 110 (via a GOP search) or explicitly by an FFD engine 100 skip frame command. Since the video decoder 110 may be configured to push out picture headers through the AUX FIFO memory whether they are skipped or not, the FFD engine 100 may be configured to filter out skipped pictures from pictures that are to be decoded.

A flag (or signal) (e.g, LookingForSecondFieldPic) may be implemented as a global control flag for streams with field-based pictures. The FFD engine 100 may be configured to implement the first field picture header to set up the decode/display parameters for the corresponding frame. The second field header may only be implemented for pan-scan vector updates. However, the FFD engine 100 may be configured to monitor header information. To implement the first slice decision process 200, the FFD engine 100 may be configured to decide whether to update the pan-scan vectors or pass the picture along for skip checking.

A flag (or signal) (e.g., SkipSecondField) may be configured as a special global control flag that may be implemented when frames skips of field-based pictures occur. If a frame skip command is set in the decoder 110, the process 100 may skip both field pictures internally. However, the process 100 may dump out (present) the second field picture header information to the AUX FIFO memory. As such, the FFD engine 100 may implement the flag SkipSecondField to control whether or not to update the pan-scan vectors for the second field.

A flag (or signal) routine (or command) (e.g., FrameSkipCheck( )) may be implemented as a FFD 100 routine configured to determine whether or not a skip has happened internally via the video decoder 110 or to issue a skip when a skip is indicated. When the flag FrameSkipCheck( ) routine returns (asserts, presents) a logic TRUE, the picture was skipped and is no longer waiting at the decoder 110.

The state 202 may be configured to receive the command (or signal) FFDProcessFirstSlice( ). The state 202 may be configured to transition to the state 204 in response to the signal FFDProcessFirstSlice( ). The state 204 may be configured to receive the global control flag PictureAtDecoder when the flag (or signal) PictureAtDecoder=TRUE. The process 200 may be configured to transition to the decision state 206. The decision state 206 may be configured to determine whether or not the flag (or signal) LookingForSecondFieldPic equals a logic TRUE. When the flag LookingForSecondFieldPic==TRUE, the process 200 may be configured to transition to the decision state 208.

The decision state 208 may be configured to determine whether or not the flag (or signal) SkipSecondField==FALSE. When the flag SkipSecondField==FALSE, the method 200 may be configured to continue to the state 210. The state 210 may be configured to update one or more second field pan-scan vectors (not shown). The routine 200 may be configured to continue to the state 220. During the state 220, the flags LookingForSecondFieldPic and SkipSecondField are both generally a logic FALSE. The routine 200 may be configured to transition from the state 220 to the state 222. The state 222 may be configured to return to the process 100 location (or state) where a halt corresponding to the process 200 occurred.

Returning to the decision state 208, when the flag SkipSecondField is not logic FALSE, the process 200 may continue to the state 212. During the state 212, the flag PictureAtDecoder is generally logic FALSE. The process 200 may transition to the state 220. Returning to the decision state 206, when the flag LookingForSecondFieldPic is not logic TRUE, the method 200 may transition to the decision state 214. The decision state 214 may be configured to determine whether or not the flag FrameSkipCheck( )==FALSE. When the flag FrameSkipCheck( ) is not a logic FALSE, the state 214 may transition to the state 216. During the state 216 the flag PictureAtDecoder is generally logic FALSE and the process 200 may continue to the state 222. Returning to the decision state 214, when the flag FrameSkipCheck( ) is a logic FALSE, the state 214 may transition to the state 218. During the state 218 the flag SkipSecondField is generally logic FALSE and the process 200 may continue to the state 222.

Figure 4:
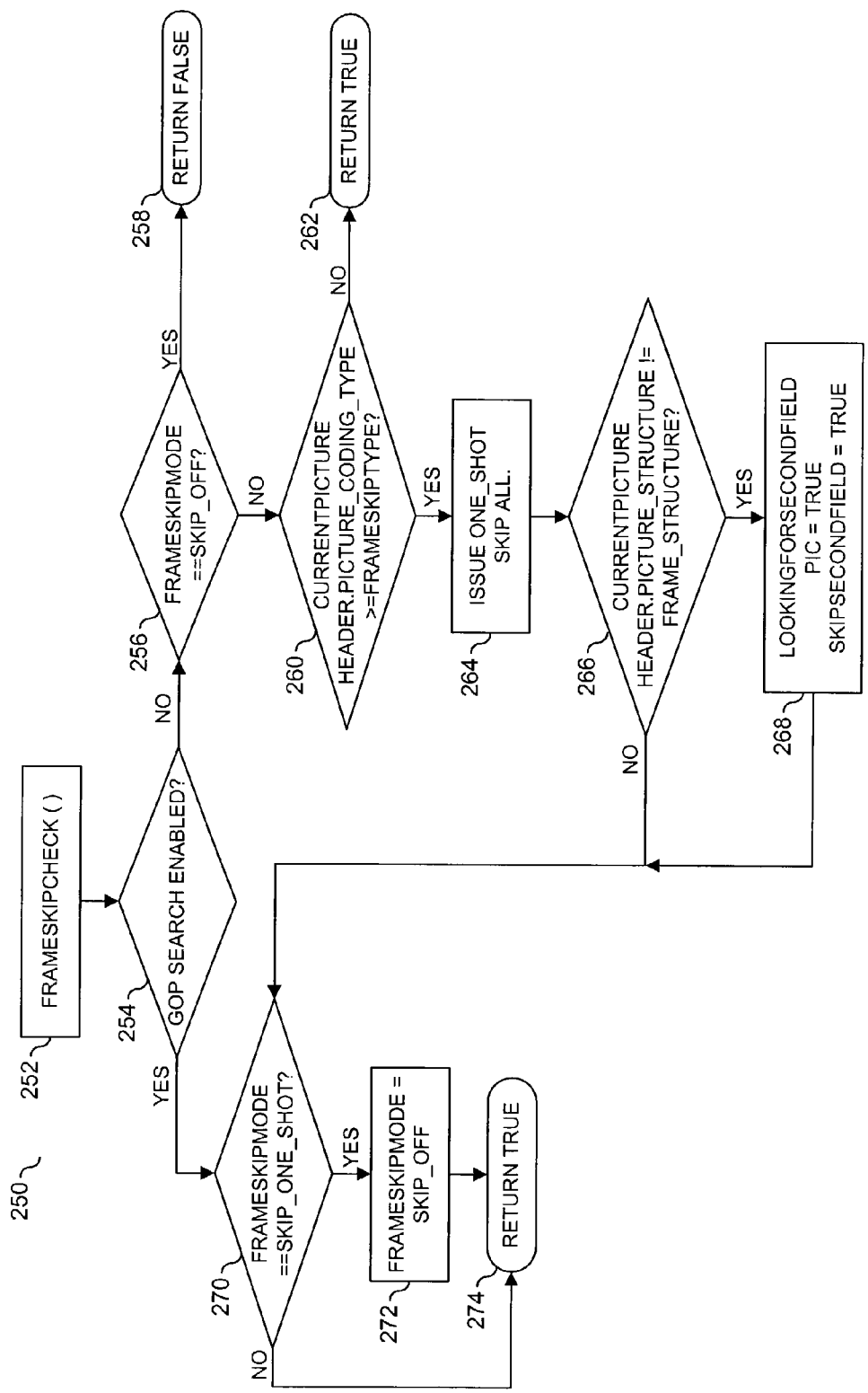
FIG. 4 is a flow diagram of another decision process in accordance with the present invention.

Referring to FIG. 4, a flow diagram 250 illustrating a decision process of the present invention is shown. The process 250 may be implemented as a skip frame decision tree. The method 250 may be configured to determine if a frame skip has been automatically processed via the system 100. The method 250 generally comprises a state (or block) 252, a decision state (or block) 254, a decision state (or block) 256, a state (or block) 258, a decision state (or block) 260, a state (or block) 262, a state (or block) 264, a decision state (or block) 266, a state (or block) 268, a decision state (or block) 270, a state (or block) 272, and a state (or block) 274.

The routine (or command) FrameSkipCheck( ) may be configured to determine whether or not a frame skip has been done automatically, in the case of a GOP search. Alternatively, if a skip has been requested by the application where the process 100 is implemented, the command FrameSkipCheck( ) may be implemented to issue (present, assert) the command that corresponds to a frame skip.

When a Layer Control Register 2 (not shown) in the video decoder 110 is set to logic 1 (or TRUE) (e.g., when search for the next GOP is requested), the video decoder 110 may be configured to skip everything in the bit stream (not shown) until the next GOP header is presented. When the next GOP header is presented, the Layer Control Register 2 may be reset to logic 0 (or FALSE). In one example, the flexibility of the system where the process 100 is implemented may be maximized where the FFD engine 100 is configured to set the GOP search bit at any time and monitor the GOP search bit. Any picture header that is presented via the AUX FIFO memory when the Layer Control Register 2==1 may be skipped internally by the video decoder 110. The video decoder 110 will generally not dump (present) picture headers into the AUX FIFO memory during a GOP search. However, the decoder 110 may be configured to synchronize the GOP search start to a frame boundary. As such, there may be one picture header dumped out (presented) to the AUX FIFO memory before the GOP search begins.

A flag (or signal) (e.g., FrameSkipMode) may be implemented as a global flag configured to control skip control. A value (e.g., SKIP_OFF) may be asserted when no skip has been requested by the application where the process 100 is implemented. As such, the respective picture may be decoded normally. The flag FrameSkipMode may be asserted having a value (e.g., SKIP_ONE_SHOT) when only one frame skip of the current type is desired. Therefore, after the skip has been issued, the flag FrameSkipMode value SKIP_ONE_SHOT is generally reset automatically to $SKIP_{13}$ OFF.

The skip frame decision process 250 may be implemented as a skip type comparison between the requested frame type to skip and the type of picture that is currently at the decoder 110. The enumerations (e.g., automatic assignments) that correspond to the T_FRAME_SKIP and the T_PICTURE_CODING_TYPE may be ordered to map directly on to the picture coding type values in the picture coding extension. A greater than (e.g., >) comparison is generally implemented to determine whether or not the picture is to be skipped in response to the characteristics of the order.

If the picture coding type is not configured as a FRAME_STRUCTURE, the picture is generally field-based. The FFD engine 100 may receive two picture headers per frame and generally is provided information configured to indicate when a received picture header corresponds to a second field or not. The SkipSecondField flag may be configured to indicate to the FFD engine 100 that the corresponding field may be ignored since the video decoder 110 may dump out (present) the corresponding header to the AUX FIFO memory even though the decoder 110 may skip the picture internally.

The state 252 may be configured to receive the command FrameSkipCheck( ). The process 250 may continue to the decision state 254. The state 254 may be configured to determine whether or not a GOP search has been enabled. When a GOP search has not been enabled the method 250 may transition to the decision state 256. The decision state 256 may be configured to determine whether or not the flag FrameSkipMode equals the value SKIP_OFF. When the flag FrameSkipMode equals the value SKIP_OFF, the routine 250 may be configured to continue to the state 258. The state 258 may be configured to return a logic FALSE value to provide the system 100 an indication that a frame skip has not been automatically performed.

Returning to the decision state 256, when the flag FrameSkipMode does not equal the value SKIP_OFF, the routine 250 may be configured to transition to the decision state 260. The decision state 260 may be configured to determine whether or not a flag (e.g., CurrentPictureHeader.picture_coding_type) >=FrameSkipType. When the flag CurrentPictureHeader.picture_coding_type is not >=FrameSkipType, the routing 250 may be configured to continue to the state 262. The state 262 may be configured to return a logic TRUE value to provide the system 100 an indication that a frame skip has been automatically performed.

Returning to the decision state 260, when the flag CurrentPictureHeader.picture_coding_type is >=FrameSkipType, the routing 250 may be configured to continue to the state 264. The state 264 may be configured to issue (present, assert, etc.) a command (e.g., One-ShotSkipAll). The routine 250 may be configured to continue to the decision state 266.

The state 266 may be configured to determine whether or not a flag (e.g., CurrentPictureHeader.picture_structure) !=FRAME_STRUCTURE. When the flag CurrentPictureHeader.picture_structure is !=FRAME_STRUCTURE, the routine 250 may be configured to continue to the state 268. During the state 268, the flag LookingForSecondFieldPic and the flag SkipSecondField are generally a logic TRUE. The routine 250 may be configured to continue to the decision state 270. Returning to the decision state 266, when the flag CurrentPictureHeader.picture_structure is not !=FRAME_STRUCTURE, the routine 250 may be configured to continue to the decision state 270.

The decision state 270 may be configured to determine whether or not the flag FrameSkipMode equals the value SKIP_ONE_SHOT. When the flag FrameSkipMode equals the value SKIP_ONE_SHOT, the routine 250 generally continues to the state 272. During the state 272, the flag FrameSkipMode generally equals the value SKIP_OFF. The process 250 generally continues to the state 274. The state 274 may be configured to return a logic TRUE value to provide the system 100 an indication that a frame skip has been automatically performed. Returning to the decision state 270, when the flag FrameSkipMode does not equal the value SKIP_ONE_SHOT, the routine 250 generally transitions to the state 274.

Figure 5:
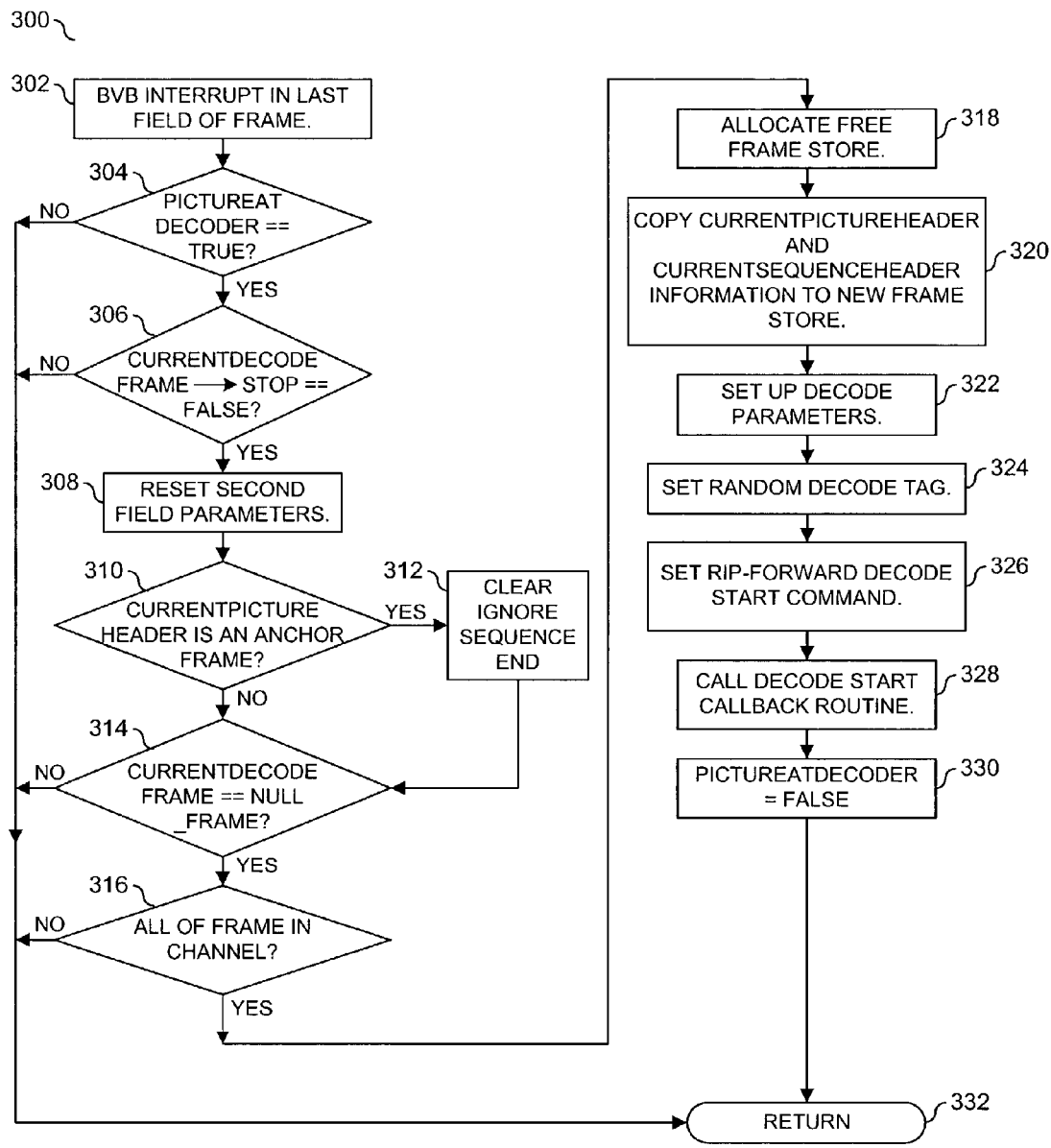
FIG. 5 is a flow diagram of another decision process in accordance with the present invention.

Referring to FIG. 5, a flow diagram 300 illustrating a decision process of the present invention is shown. The process 300 may be implemented as a BVB picture decode decision tree. The method 300 may be configured to determine a number of decode parameters via the system 100. The method 300 generally comprises a state (or block) 302, a decision state (or block) 304, a decision state (or block) 306, a state (or block) 308, a decision state (or block) 310, a state (or block) 312, a decision state (or block) 314, a decision state (or block) 316, a state (or block) 318, a state (or block) 320, a state (or block) 322, a state (or block) 324, a state (or block) 326, a state (or block) 328, a state (or block) 330, and a state (or block) 332.

The FFD engine 100 may be configured to begin the decode process of a picture at the BVB interrupt for the last field of a frame (e.g., the state 102 when the signal BVB_INT is asserted). The process 100 may be configured to minimize complexity and to provide an entire frame time for the decoding of the picture. The FFD engine 100 is generally configured to proceed with decode process of a picture if there is actually a picture (e.g., the frame FREE_FRAME) waiting at the decoder 110. A routine (command) FFDProcessFirstSlice( ) may be configured to set a flag (e.g., PictureAtDecoder) =TRUE when the picture at the decoder 110 needs to be decoded.

A pointer (e.g., CurrentDecodeFrame) generally points to the frame store FREE_FRAME structure that is currently being decoded or to NULL_FRAME if nothing is being decoded. If the flag CurrentDecodeFrame→stop ==TRUE, the application where the routine 100 is implemented may have explicitly requested a halt to the decode process 132. As such, the picture decode process 132 will generally not proceed. If the current picture at the decoder 110 is an anchor frame (e.g., frames that correspond to the blocks 122 and 124 and/or the signal ANCH_IMAGE) an Ignore Sequence End bit may be cleared in the decoder 110 Layer Control Register 1 (not shown).

If the flag CurrentDecodeFrame ==NULL_FRAME (e.g., the state 314 is YES), then no picture (video image) is currently being decoded via the process 100. The decoder 110 may be free and the new picture may start the decode process. If the flag CurrentDecodeFrame !=NULL_FRAME, then another picture is generally still at the decoder 110. Generally the flag CurrentDecodeFrame ==NULL_FRAME in the case of the explicit repeat requests or similar requests (such as slow) from the application where the process 100 are implemented when the entire decode/display process 100 is stalled for the repeat period. In the case of a stall, the decode process generally waits for the next BVB in last field to determine when to proceed with the decode process.

If the FFD channel panic system (not shown) is enabled (e.g., via calling a command FFDChannelPanicEnable( )) then a routine (e.g., ChannelPanicCheck( )) may be called by the FFD engine 100 before decode is to proceed. Before the video decoder 110 starts the decode of a frame (e.g., the frame FREE_FRAME), all of the respective frame is generally in the video elementary channel (not shown). Otherwise picture tearing may occur since the decoder 110 may encounter a data underflow point. The command ChannelPanicCheck( ) may be asserted when the decoder 110 encounters a data underflow point. The command ChannelPanicCheck( ) may be initiated to determine the structure of the picture awaiting decode and to determine whether or not the picture is fully in the respective channel via checking the number of picture headers currently in the video elementary channel. The video decoder 110 may increment a counter (not shown) configured to monitor the number of picture headers that enter the elementary channel and decrement the counter as the picture headers go through the decoder 110.

The FFD engine 100 may be configured to determine whether or not more than one frame exists (is resident) in the elementary channel. Having more than one frame of the elementary channel may imply that the entire frame of the frame at the decoder 110 is fully in the channel. For frame-based pictures only one extra picture header may be in the elementary channel when the channel is full. For field-based pictures, the elementary channel may be full when two headers are in the elementary channel (e.g., one for each field). In the case of a sequence end code, other picture headers may be absent from the channel. However, the entire current frame may be in the channel. The system 100 is generally configured to disable channel panic via calling a command (e.g., FFDChannelPanicDisable( )) when a sequence end code is encountered.

When the FFD engine 100 is configured to start the decode of a frame, the FFD engine 100 first may allocate an unused (free) framed store FREE_FRAME from the free frame store (or pool) 130 and then copy all of the current sequence and picture information to the new frame store 132. The sequence is generally preserved (and presented) with the picture because sequence headers may occur between pictures. As such, pictures in different frame stores may have different sequence parameters. The specific sequence and picture parameters are then generally entered into the video decoder 110 in preparation for decode to begin.

A random tag may be generated and written into the first and second field luma frame stores (not shown). The random tag may be implemented as a final check to see if a picture has actually been decoded or was skipped internally by the video decoder 110. In one example, two 8-byte sequences of random numbers may be generated and written into the beginning of each field in the luma data stores. In the display process the two 8-byte sequences are generally read out. If the data read out is different from the data written in, the decoder 110 may have overwritten the read out data with picture data and the picture is generally displayed. The FFD 100 open GOP/broken link B frame skip detect system may be configured to check on the read out data.

The state 302 may be configured to correspond to a BVB interrupt in the last field of a frame (e.g., the signal BVB_INT). The method 300 may continue to the decision state 304. The decision state 304 may be configured to determine whether or not the flag PictureAtDecoder ==a logic TRUE. When the flag PictureAtDecoder ==a logic TRUE, the process 300 generally transitions to the decision state 306.

The decision state 306 is generally configured to determine whether or not the flag CurrentDecoderFrame→stop ==a logic FALSE. When the flag CurrentDecoderFrame→stop ==FALSE, the process 300 generally transitions to the state 308. The state 308 may be configured to reset the appropriate second field parameters. The process 300 may continue to the decision state 310.

The decision state 310 may be configured to determine whether or not the frame header CurrentPictureHeader corresponds to an anchor frame (e.g., a frame that corresponds to the video image ANCH_IMAGE). When the frame header CurrentPictureHeader is an anchor frame, the process 300 generally transitions to the state 312. The state 312 may be configured to clear a bit that corresponds to an Ignore Sequence End status. The process 300 may continue to the decision state 314.

Returning to the decision state 310, when the frame header CurrentPictureHeader is not an anchor frame, the process 300 generally transitions to the decision state 314. The decision state 314 may be configured to determine whether or not the flag (or signal) CurrentDecodeFrame ==the value NULL_FRAME. When the flag CurrentDecodeFrame ==NULL_FRAME, the process 300 generally continues to the decision state 316.

The decision state 316 may be configured to determine whether or not all of the respective frame is in channel (not shown). When all of the respective frame is in channel, the process 300 may continue to the state 318. The state 318 may be configured to allocate the free frame store 130. The method 300 generally continues to the state 320'.

The state 320 may be configured to copy the information that corresponds to the CurrentPictureHeader and the CurrentSequenceHeader to the new frame store 132. The routine 300 generally continues to the state 322. The state 322 may be configured to set up one or more appropriate decode parameters (e.g., parameters that may correspond to the normal decode mode, one or more trick modes, arbitrary scaling, etc.). The routine 300 generally continues to the state 324.

The state 324 may be configured to set the random decode tag. The process 300 generally continues to the state 326. The state 326 generally sets (issues, asserts, presents, etc.) the rip forward decode start command. The process 300 generally transitions to the state 328. The state 328 may be configured to call the decode start callback routine. The process 300 generally continues to the state 330. During the state 330, the flag PictureAtDecoder generally is logic FALSE. The process 300 generally transitions to the state 332. The state 332 may be configured as a return state. The process 300 generally returns to the system 100 location (or state) where the BVB interrupt in the last field of the frame corresponding to the process 300 occurred.

Returning to the decision state 304, when the flag PictureAtDecoder does not ==a logic TRUE, the process 300 generally transitions to the state 332. Returning to the decision state 306, when the flag CurrentDecoderFrame→stop does not ==FALSE, the process 300 generally transitions to the state 332. Returning to the decision state 314, when the flag CurrentDecodeFrame does not ==NULL_FRAME, the process 300 generally continues to the state 332. Returning to the decision state 316, when all of the respective frame is not in channel, the process 300 may continue to the state 332.

Figure 6:
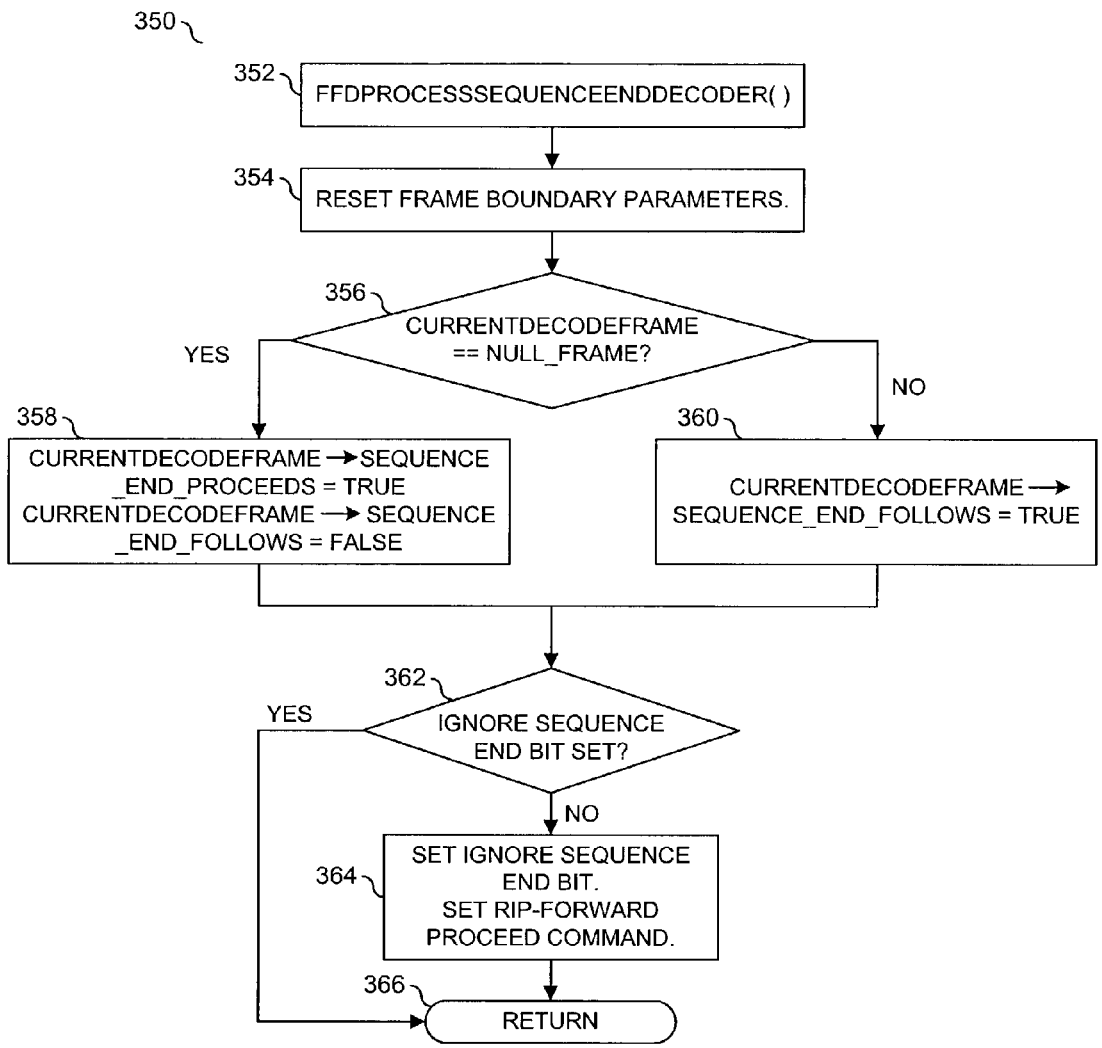
FIG. 6 is a flow diagram of another decision process in accordance with the present invention.

Referring to FIG. 6, a flow diagram 350 illustrating a decision process of the present invention is shown. The process 350 may be implemented as a sequence end decoder decision tree. The method 350 may be configured to process (perform, execute, etc.) a number of sequence end codes (not shown) via the system 100. The method 350 generally comprises a state (or block) 352, a state (or block) 354, a decision state (or block) 356, a state (or block) 358, a state (or block) 360, a decision state (or block) 362, a state (or block) 364, and a state (or block) 366.

Sequence end codes may be processed separately by the FFD engine 100 since the video decoder 110 generally processes sequence end codes differently from normal pictures. When the rip forward (decode override) mode is enabled, the video decoder 110 may be configured to halt at a sequence end code and wait for a proceed with decode command, similarly to a normal picture. However, the video decoder 110 will generally assert a separate interrupt for the sequence end detection. The FFD engine 110 may be notified when a sequence end has been detected via the application calling a command (e.g., FFDProcesSequenceEndDecoder( )). The FFD engine 100 may set one or more sequence end control flags that correspond to the frame the command CurrentDecodeFrame is pointing to.

If the tag CurrentDecodeFrame ==NULL_FRAME, there is generally no picture being decoded. As such, the sequence end is generally processed next by the display system 100. The no picture being decoded status may be signaled by setting the flag CurrentDecodeFrame→sequence_end_preceeds ==TRUE. If the flag CurrentDecodeFrame !=NULL_FRAME, a picture may currently being decoded. The display system 100 may process the corresponding sequence end code after the current picture such that the flag CurrentDecodeFrame→sequence_end_follows =TRUE. In some cases, sequence_end_preceeds and sequence_end_follows may equal to TRUE simultaneously.

If the Ignore Sequence End bit in the Layer Control Register 1 is set, the video decoder 110 may be configured to skip through any sequence end code that occurs. If the Ignore Sequence End bit is cleared, the decoder 110 may halt at the sequence end code until the rip forward proceed command is set by the host CPU. The FFD engine 100 may implement these two features to control display and to filter out multiple sequence end cases. By default, the FFD engine 100 may clear the Ignore Sequence End bit in the decoder 110. When the first sequence end code is presented, the FFD engine 100 may enable the Ignore Sequence End bit and set the rip forward command. The video decoder 110 may be configured to automatically skip every following sequence end code. The Ignore Sequence End bit may be cleared when the next anchor frame is ready to be decoded. Clearing the Ignore Sequence End bit generally starts a new sequence and the system 100 may be configured to determine the presence of sequence end codes again.

The state 352 may be configured to receive the command (or signal) FFDProcessSequenceEndDecoder( ). The state 352 may be configured to transition to the state 354 in response to the signal FFDProcessSequenceEndDecoder( ). The state 354 may be configured to reset appropriate frame boundary parameters in response to the command FFDProcessSequenceEndDecoder( ). The process 350 generally transitions to the decision state 356.

The decision state 356 may be configured to determine whether or not a flag (e.g., CurrentDecodeFrame) equals the value NULL_FRAME. When the flag CurrentDecodeFrame ==NULL_FRAME, the method 350 generally transitions to the state 358. During the state 358 a flag (e.g., CurrentDecodeFrame→sequence_end_proceeds) generally equals logic TRUE and a flag (e.g., CurrentDecodeFrame→sequence_end_follows) generally equals logic FALSE. The method 350 may continue to the decision state 362.

Returning to the decision state 356, when the flag CurrentDecodeFrame does not ==NULL_FRAME, the method 350 generally transitions to the state 360. During the state 360 the flag CurrentDecodeFrame→sequence_end_follows generally equals logic TRUE. The method 350 may continue to the decision state 362.

The decision state 362 may be configured to determine whether or not the Ignore Sequence End bit is set. When the Ignore Sequence End bit is set, the process 350 generally transitions to the state 366. The state 366 may be configured as a return state. The process 350 generally returns to the system 100 location (or state) where the command FFDProcessSequenceEndDecoder( ) corresponding to the process 350 occurred.

Returning to the decision state 362, when the Ignore Sequence End bit is not set, the process 350 generally transitions to the state 364. The state 364 may be configured to set the Ignore Sequence End bit and to set the Rip-forward proceed command. The process 350 generally continues to the state 366.

Figure 7A:
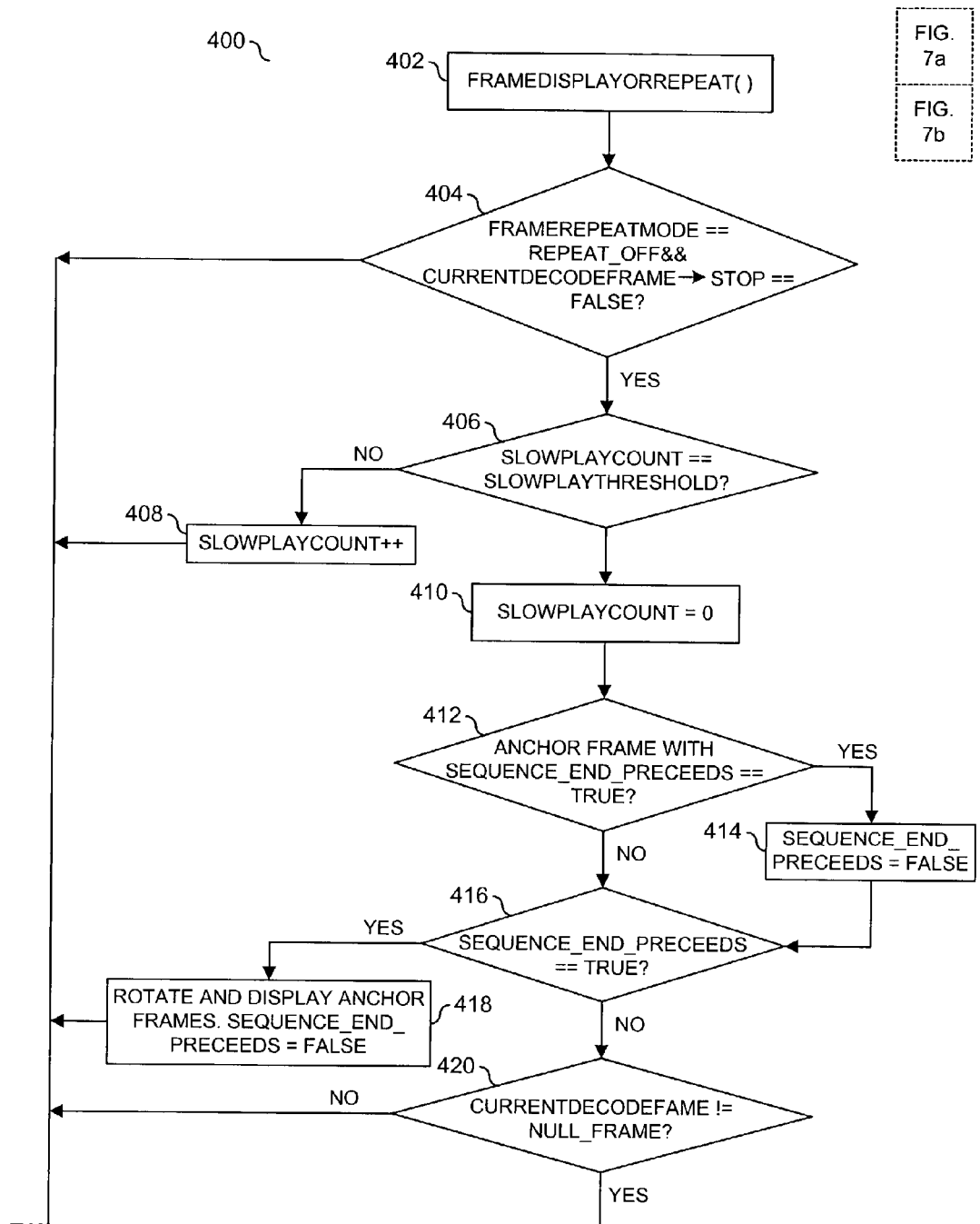
FIGS. 7(a–b) are a flow diagram of another decision process in accordance with the present invention.
Figure 7B:
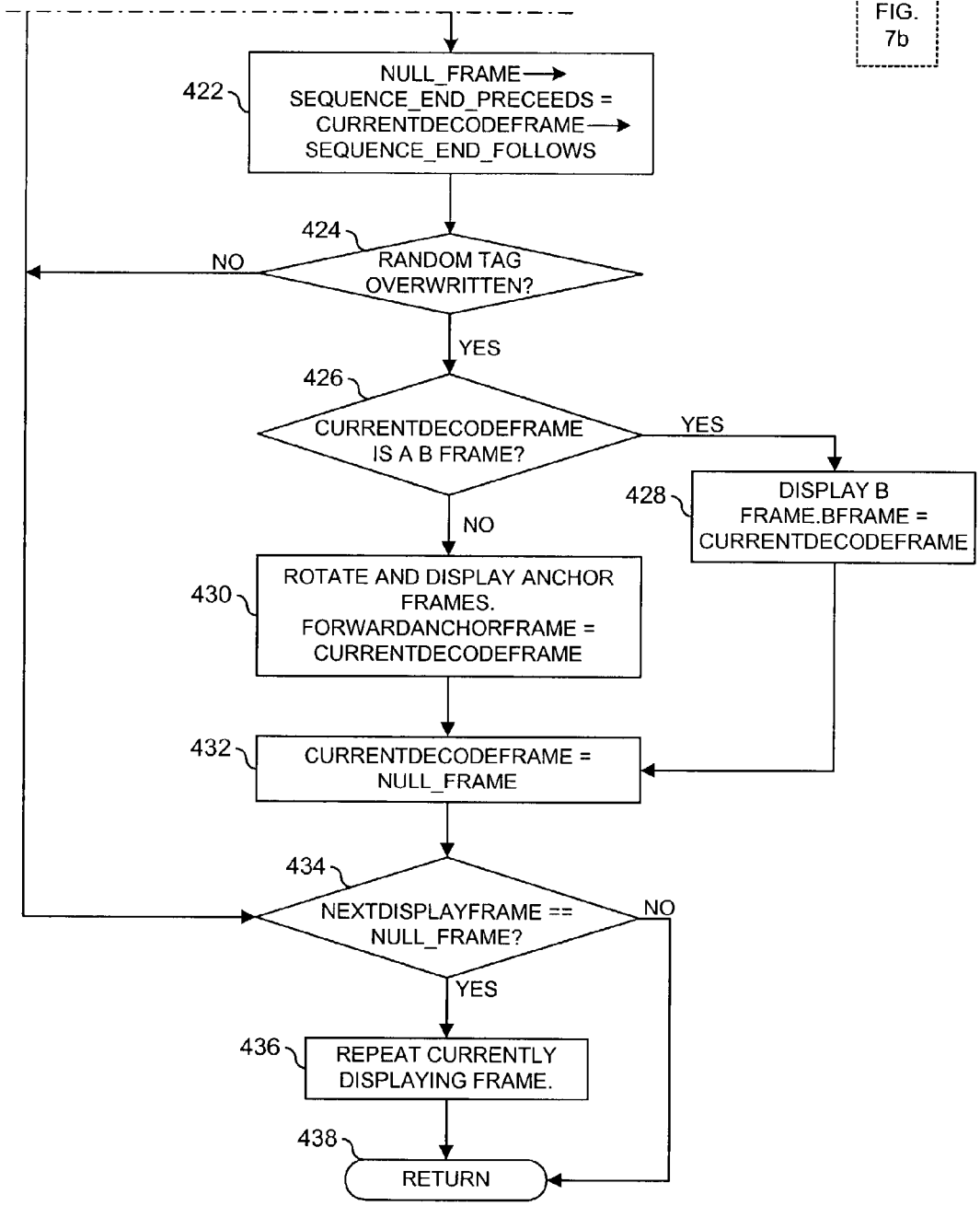

Referring to FIGS. 7(a–b), a flow diagram 400 illustrating a decision process of the present invention is shown. The process 400 may be implemented as a frame display update decision tree. The method 400 may be configured to determine whether or not to repeat the currently displaying frame (e.g., the frame that corresponds to the frame store 140) via the system 100. The method 400 generally comprises a state (or block) 402, a decision state (or block) 404, a decision state (or block) 406, a state (or block) 408, a state (or block) 410, a decision state (or block) 412, a state (or block) 414, a decision state (or block) 416, a state (or block) 418, a decision state (or block) 420, a state (or block) 422, a decision state (or block) 424, a decision state (or block) 426, a state (or block) 428, a state (or block) 430, a state (or block) 432, a decision state (or block) 434, a state (or block) 436, and a state (or block) 438.

In one example, a basis for control in the display process portion of the process 100 may be a display override feature of the decoder 110. The display override feature may provide the FFD engine 100 complete control of the display process. As such, the process 100 may overcome the limitations of the conventional procedure of decoding and displaying from the same frame store for B frames (e.g., the video image B_IMAGE).

A majority of the display process portion of the process 100 may be implemented during the Begin Active Video (BAV) interrupt (e.g., the block 104). For each BAV, the pan-scan vectors (not shown) for the next field are updated and, on the last field, the next frame to be displayed may be set up in the decoder 110 display controller (not shown). The corresponding display change may take effect on the next (subsequent) field.

In one example, only one display line time may be presented between the assertion of the BVB interrupt BVB_INT and the display changing to the next field. System latencies may cause the hard deadline to be missed so that when the FFD engine 100 finally gets notified that the process 100 has transitioned to a BVB process, the corresponding field status bits may have changed. The system 100 may be in an undetermined state. The decoder 110 display controller may latch the values for the next frame to be displayed at the field change. As such, the values for the next frame are generally updated before the fields have changed. As such, display decisions may be made and executed in the BAV interrupt period. A control flag (e.g., InLastField) may be set to logic TRUE in the case of a last field to notify the BVB interrupt routine that the control flag corresponds to a last field since some non-time sensitive processes may be pending.

The Current Decode Frame field pointers are generally updated when decode of a picture has been initiated. However, the FFD engine 100 will generally be provided the location that the video decoder 110 is decoding such that the process 100 may set up the proper frame store addresses. The system 100 may be configured to decode B frames in the B frame store 120. To determine if a decoded anchor frame will go into the anchor 1 (e.g., the block 122), or anchor 2 frame store (e.g., the block 124), the FFD engine 100 may be configured to monitor the value the Current Decode Frame field shows at a point where decode is known to be complete or in process. The point monitored is generally the BAV in the last field since the process 100 is generally configured to implement the point where decode is complete to process the display update. By monitoring the Current Decode Frame field while an anchor frame is known to be decoding, the decode process may be configured to implement the inverse of the Current Decode Frame field value as the next anchor frame store. The control flag PreviousAnchorStorePointer may be configured to store the last anchor decode frame store.

When the pan-scan update portion (section, routine, segment, etc.) of the system 100 is enabled, the FFD engine 100 may be configured to update the pan-scan offsets for each field via entering the values from the picture display extension (not shown). A number of routines (e.g., FFDPanScanEnable( ) and FFDPanScanDisable( )) may control the corresponding vector update since the decision to implement the offsets may be a user setting. As such, the application where the process 100 is implemented may provide an indication to the FFD engine 100 when to start the update process.

The FFD engine 100 may receive the horizontal frame center offsets from the picture display extension and convert the offsets to a format the decoder 110 display controller may implement. One or more MPEG standards may provide that the vectors are offsets from the center of the decoded frame (as the name suggests). The decoder 110 may be configured such that the offsets may be provided in terms of offsets from the start of the decoded frame. The FFD engine 100 may process a translation between the center and the start of the decoded frame and may also process the translation between horizontal size value in the sequence header and the display horizontal size value in the sequence display extension. In one example, the FFD engine 100 may be configured to truncate the least significant bit of the offsets.

The display update process section of the routine 100 may be implemented via three frame store pointers (e.g., BFrame, ForwardAnchorFrame, and BackwardAnchorFrame). The pointers BFrame, ForwardAnchorFrame, and BackwardAnchorFrame may correspond to the blocks 120, 122, and 124, respectively. When the picture at the pointer CurrentDecodeFrame (e.g., the picture in the block 134) is ready to be displayed, the FFD engine 100 may be configured to determine what picture type is to be displayed. If the picture is a B frame (e.g., the video image B_IMAGE), the picture may be immediately set up for display via the block 140 and assigned to the BFrame pointer. The previous contents of the pointer may be released to the free frame store 130 (e.g., the signal FREE_FRAME). If the picture in the block 134 is an anchor frame (e.g., the video image ANCH_IMAGE), the current pointer ForwardAnchorFrame may be set up for display and assigned to BackwardAnchorFrame 124. The previous contents of BackwardAnchorFrame 124 may be released to the free frame store 130 and the incoming frame 134 may be assigned to the ForwardAnchorFrame 122. By rotating (shuffling) the anchors in accordance with the present invention, a proper set of anchor frames are generally maintained for B frame (e.g., the video image B_IMAGE) predictions.

When the FFD engine 100 determines the proper conditions to set up a new frame for display, the FFD engine 100 may present the relevant parameters to the decoder 110 display controller. However, since the new frame display is generally implemented on the last field BAV, the display change does not generally physically take place until the next field. A pointer (e.g., CurrentDisplayFrame) generally points to the frame that is currently being displayed. As such, the pointer CurrentDisplayFrame is generally left unchanged during the period when a new frame is set up. Instead, a pointer (e.g., NextDisplayFrame) is generally set to the frame that will be displayed and the CurrentDisplayFrame 140 is generally updated at the next BVB.

The process 100 may be configured to provide three modes of operation that generally (i) prohibit the display change from taking place and (ii) force the repeat of the current frame. In one example, the corresponding commands are generally checked first by the FFD 100 driver prior to executing the implicit repeat checks. The explicit repeat commands may be configured to stall the decode process. Since the current display is generally being repeated, the current decode may be configured to remain at a current state. Since the current decode 140 is generally not being cleared, the decode system may halt until the current decode 140 has been removed for display. The system 100 may be configured to avoid buffer overflows.

In another example, by calling a command (e.g., FFDRepeatFrame (repeat)) the application where the FFD engine 100 is implemented may be configured to stall the display process on the frame that is currently displaying (e.g., the block 140) for either one display time or a substantial display time, depending whether the repeat parameter is REPEAT_ONE_SHOT or REPEAT_CONTINUOUS, respectively. The FFD engine 100 may automatically clear a REPEAT_ONE_SHOT to REPEAT_OFF after the repeat has been performed. A REPEAT_CONTINUOUS status is generally cancelled by calling commands FFDRepeatFrame(REPEAT_OFF) or FFDResetDecode( ).

By calling a command FFDSlowPlay(frame_delay) the application where the system 100 is implemented may force the FFD engine 100 to alter the rate of the display update. A parameter (e.g., frame_delay) may be configured to determine the number of frame display times to delay the next frame. In one example, a value of one may cause the FFD engine 100 to change display every other frame time, which may have the effect of slowing the display rate by half. A value of two may cause the display rate to slow by a third, and so on. However, other display rates may be implemented to meet the design criteria of a particular application. To clear the slow play mode, the application generally calls a command (e.g., FFDSlowPlay(0)) or a command (e.g., FFDResetDecode( )).

In yet another example, a stop command from the application where the process 100 is implemented may be configured to halt the decode/display process of the FFD engine 100. When a stop command has been asserted, the stop command effects may be similar to the command REPEAT_CONTINUOUS frame repeat. The command FFDStartDecode( ) is generally implemented to clear a stop.

A FFD display freeze feature may be implemented as a special feature of the FFD engine 100. The FFD display freeze may halt the display process so the currently displaying frame is repeated continuously, but the decode process is not stalled as would occur in a conventional repeat process. The normal frame store pointer update may be implemented similar to a conventional decoder except the actual display update in the decoder 110 display controller may not be processed. The display freeze feature may be implemented when a freeze on a frame is desired. However, the display freeze feature may be implemented without delays in (i) startup or (ii) A/V synchronization when normal display is resumed. As such, skip, repeat, and stop on decode commands are fully implemented during the display freeze. When the display is not changing, a stop on display may be nonfunctional unless the stop picture type coincides with the display that is frozen on.

In one example, the FFD engine 100 may provide three modes of operation that may prevent the automatic update of the display with a new frame in response to system dynamics. None of the three methods generally stalls the decode process as the conventional explicit commands do. In a first case, no frame may be currently being decoded. If the pointer CurrentDecodeFrame ==NULL_FRAME, the decode process has generally not started picture decode at the previous last field BVB (e.g., in response to skip commands, buffer underflows, channel panic, etc.). As such, the display process to update with the current frame will generally be repeated.

In another case, no frame may be currently in the forward anchor frame store 122. In contrast to B frames, an anchor frame is generally not displayed immediately after being decoded. Anchor frames are generally first presented to the forward anchor frame 122 and when another anchor is presented by the decode frame store 112, the forward frame 122 is generally moved (transferred, presented) to the backward anchor frame 124 and displayed via the block 140. When the pointer ForwardAnchorFrame==NULL_FRAME, there may be no picture data in the forward anchor frame store 122 to move to the backward anchor store 124. Thus no display update may be implemented. The forward anchor store 122 may be vacant in cases of startup or sequence end codes.

In another case, random tag failure may occur. In certain situations the decoder 110 may skip pictures internally without notification to the host, the FFD engine 100 may be configured to verify that a picture that was set for decode was actually decoded by the decoder 110. The verification may be implemented via writing in two 8-byte strings into the luma frame store of the new frame, one string for each field. The 8-byte strings may be randomly generated. The strings are generally implemented as 8-bytes when 8-bytes is the natural word length of the decoder 110. As such, the 8-byte length may simplify read and write processes. However, the string word length may be the appropriate length to meet the design criteria of a particular application.

The system 100 may provide a final check before display update comprising (i) a read of the strings out of the frame store and (ii) comparison with what was written in. When the comparison indicates a difference, the decoder 110 may have overwritten the strings with decoded picture data and a display is generally implemented via the state 140. When the write in and read out are identical, the decoder may have internally skipped the frame and a display update will generally not be performed. A frame tag failure may occur when the decoder 110 detects internal errors in the bit stream and/or when the broken link bit is set in an open GOP.

A sequence end code may provide the display process an indication that any decoded, but not displayed, anchor frame 122 and/or 124 are available to be displayed. The sequence end code may force the display of the forward anchor frame 122 and the subsequent assignment (transfer) to the backward anchor frame 124. The ForwardAnchorFrame 122 may be set to the value NULL_FRAME since there is generally no incoming anchor frame to present to the block 122.

Sequence end codes may be reported (presented) differently than normal pictures to the host by the decoder 110. Sequence end codes may be processed differently by the FFD engine 110 than normal pictures. Since sequence end codes may precede and follow a frame, each frame store structure may be implemented having two fields to track these cases (e.g., sequence_end_preceeds and sequence_end_follows). The sequence_end_preceeds field may be actively acted upon via the process 100. During the display process, when the FFD engine 100 determines that there are no explicit repeat commands pending, the sequence_end_preceeds field is generally checked first. When the sequence_end_preceeds field is TRUE, the sequence end anchor shuffle (e.g., transfer from the block 122 to the block 124) may be implemented and the display update is generally complete. When the sequence_end_preceeds field is FALSE the system 100 may be implemented as a normal display process. In cases where the sequence_end_preceeds field is attached to an anchor frame, the sequence_end_preceeds is generally ignored since the anchor frame will push out (e.g., present to the block 124) the current forward anchor.

Before the FFD engine 100 performs the implicit repeat checks, the FFD engine 100 may assign NULL_FRAME→sequence_end_preceeds=Current DecodeFrame→sequence_end_follows. If there are no explicit repeats pending, regardless of any other processes the FFD engine 100 generally assigns the pointer CurrentDecodeFrame=NULL_FRAME at the end to clear out any contents. By moving the sequence_end_follows to the next sequence_end_preceeds, the FFD engine 100 may ensure the sequence end code will be given top priority in the next last field BAV.

The state 402 may be configured to receive the command (or signal) FrameDisplayOrRepeat( ). The state 402 may be configured to transition to the decision state 404 in response to the signal FrameDisplayOrRepeat( ). The decision state 404 may be configured to determine whether or not a flag (e.g., FrameRepeatMode) =a value REPEAT_OFF logical AND a flag (e.g., CurrentDecodeFrame→stop) =logic FALSE. When the flag FrameRepeatMode) =a value REPEAT_OFF and the flag CurrentDecodeFrame→stop=logic FALSE, the routine 400 generally transitions to the decision state 406.

The decision state 406 may be configured to determine whether or not a counter value (e.g., SlowPlayCount) equals a predetermined threshold value (e.g., SlowPlay/Threshold). When the counter SlowPlayCount equals the value SlowPlay/Threshold, the process 400 generally continues to the state 410.

The state 410 generally sets the counter value SlowPlayCount =0. The process 400 generally continues to the decision state 412. The decision state 412 may be configured to determine whether or not the frame that corresponds to the decode frame 122 is an anchor frame (e.g., a frame that corresponds to the video image ANCH_IMAGE) having a sequence_end_preceeds bit ==logic TRUE. When the corresponding sequence_end_preceeds bit ==logic TRUE, the routine 400 may be configured to continue to the state 414. The state 414 may be configured to set the sequence_end_preceeds bit to logic FALSE. The routine 400 generally continues to the decision state 416.

Returning to the decision state 412, when the corresponding anchor frame sequence_end_preceeds bit does not ==logic TRUE, the routine 400 may be configured to transition to the decision state 416. The decision state 416 may be configured to determine whether or not the sequence_end_preceeds bit ==logic TRUE. When the sequence_end_preceeds bit does not ==logic TRUE, the routine 400 may be configured to transition to the decision state 420.

The decision state 420 may be configured to determine whether or not a flag (e.g., CurrentDecodeFrame) !=the value NULL_FRAME. When the flag CurrentDecodeFrame !=the value NULL_FRAME, the process 400 may continue to the state 422. The state 422 may be configured to set a flag (e.g., NULL_FRAME→sequence_end_preceeds) equal to a value (e.g., CurrentDecodeFrame→sequence_end_follows). The process 400 may continue to the decision state 424.

The decision state 424 may be configured to determine whether or not the random tag has been overwritten. When the random tag has been overwritten, the process 400 may transition to the decision state 426. The state 426 may be configured to determine whether or not the frame that corresponds to the pointer CurrentDecodeFrame (e.g., the frame that corresponds to the frame store 112) is a B frame (e.g., the video image B_IMAGE). When the frame that corresponds to the pointer CurrentDecodeFrame is a B frame, the process 400 generally continues to the state 428. The state 428 may be configured to set a parameter (flag) (e.g., Display B Frame.BFrame) equal to the value CurrentDecodeFrame. The process 400 may continue to the state 432.

Returning to the decision state 426, when the frame that corresponds to the pointer CurrentDecodeFrame is not a B frame, the process 400 generally continues to the state 430. The state 430 may be configured to rotate and display anchor frames (e.g., the video image ANCH_IMAGE in connection with the frame stores 122, 124 and 140). The state 430 may also be configured to set a pointer (e.g., ForwardAnchorFrame) equal to the value CurrentDecodeFrame. The process 400 generally continues to the state 432. The state 432 may be configured to set the pointer CurrentDecodeFrame to the value NULL_FRAME. The routine 400 generally continues to the decision state 434.

The decision state 434 may be configured to determine whether or not a pointer (signal, flag, etc.) (e.g., NextDisplayFrame) equals the value NULL_FRAME. When the pointer NextDisplayFrame equals the value NULL_FRAME, the method 400 may transition to the state 436. The state 436 may be configured to repeat the display of the currently displaying frame (e.g., the frame that corresponds to the frame store 140). The method 400 generally continues to the state 438.

The state 438 may be configured as a return state. The process 400 generally returns to the system 100 location (or state) where the command FrameDisplayOrRepeat( ) corresponding to the process 400 occurred. Returning to the decision state 404, when the flag FrameRepeatMode ==a value REPEAT_OFF logical AND the flag CurrentDecodeFrame→stop does not ==logic FALSE, the routine 400 generally transitions to the state 434.

Returning to the decision state 406, when the counter SlowPlayCount does not equal the value SlowPlay/Threshold, the process 400 generally continues to the state 408. The state 408 may be configured to increment the counter value SlowPlayCount by one. The method 400 may be configured to continue to the decision state 434. Returning to the state 416, when the sequence_end_preceeds bit ==logic TRUE, the routine 400 may be configured to transition to the state 418. The state 418 may be configured to rotate and display the respective anchor frame (e.g., the video image ANCH_IMAGE via the frame store 140). The state 418 may also be configured to set the sequence_end_preceeds bit =logic FALSE. The method 400 may continue to the decision state 434.

Returning to the decision state 420, when the flag CurrentDecodeFrame does not !=the value NULL_FRAME, the process 400 may continue to the decision state 434. Returning to the decision state 424, when the random tag has not been overwritten, the process 400 may transition to the decision state 434.

When the FFD engine 100 sets up a new frame for display (e.g., on last field BAV), the FFD engine 100 may be configured to determine if the new frame will cause a field inversion and if so, correct for the inversion. The basis for field syncing is generally that top fields are displayed on odd fields and bottom fields are displayed on even fields. In the FFD engine 100, the logic (process, routine, instruction set, method, etc.) may be configured to make comparisons regarding the current field when the frame under comparison will be displayed in the next field. For frame-based pictures, the top_field_first bit of the picture header may be compared with the current field. When the flag top_field_first ==TRUE, the next field is generally odd. When the current field is odd, an inversion may occur. The reverse generally occurs. When the flag top_field_first ==FALSE, the next field is generally even. When the current field is even, an inversion generally occurs. The decoder 110 display controller may be configured to indicate the odd/even field via a single bit with TRUE corresponding to an odd field and FALSE corresponding to an even field. As such, the field inversion comparison may be implemented via one line of code. In one example, the following code may be implemented:

```
if (top_field_first == odd_field)
{
/* field inversion */
}
```

However, the field inversion may be implemented via any appropriate code, routine, hardware, firmware, etc. to meet the design criteria of a particular application.

Field based pictures may be implemented similarly, except there is generally no top_field_first bit to check. Top field pictures may be compared to determine if odd_field ==TRUE (odd_field) and bottom field pictures may be compared to determine if odd_field ==FALSE (!odd_field) to indicate an inversion. Correction for field inversions may be similar for frame and field based frames. The process 100 may be configured to insert a pulldown if a pulldown is not requested (e.g., repeat_first_field ==FALSE), or remove the pulldown if the pulldown has been requested. In the case of field-based pictures, the FFD engine 100 generally inserts a pulldown since the command repeat_first_field may not be implemented in the case of field-based pictures. The pulldown of the present invention may be implemented as described in U.S. Pat. No. 6,118,491, which is incorporated in its entirety herein.

The process 100 may be configured to implement a begin vertical blanking (BVB) interrupt. The display process cycle may be completed in the BVB interrupt for the last field of the frame. The FFD engine 100 may be configured to determine that a new frame will generally be displayed. The FFD engine 100 may update the CurrentDisplayFrame pointer. When the flag NextDisplayFrame !=NULL_FRAME, a frame has been set up in the decoder 110 display controller and the frame may be displayed at the field switch. In this case, the pointer CurrentDisplayFrame generally equals the pointer NextDisplayFrame.

The method 100 may be configured to implement a stop process. The stop system segment in the FFD engine 100 may be more extensive than setting or clearing of a state flag, as implemented in conventional API calls. Since the method 100 generally stops the system where implemented gracefully at a point where other operations can take place without damaging the system (e.g., causing picture blankout, tearing, etc.), the method 100 generally monitors the system where implemented and then presents the stop routine when conditions are proper.

Stop routines are generally requested from the application where the method 100 is implemented via an API call (e.g., FFDStopDecode(stop_mode, stop_pic)). The stop_pic parameter may provide an indication to the FFD engine 100 what kind of picture to stop on (e.g., I, P, B, any anchor frame (I or P), any type of frame, etc.). The stop_mode parameter may be either STOP_ON_DECODE or STOP_ON_DISPLAY, with each having slightly different stop criteria. In any case, the stop request is generally checked in the last field BVB interrupt segment of the process 100. Since the last field BVB interrupt is generally where the CurrentDisplayFrame pointer is updated as well as where the decode of a picture is started, the last field BVB interrupt may be a suitable place to halt future operations.

For STOP_ON_DISPLAY requests, the picture type of the frame referenced via the pointer CurrentDisplayFrame is generally compared with the stop_pic parameter. If they match, the stop is generally implemented via setting the flag CurrentDecodeFrame→stop =TRUE. Since the flag CurrentDecodeFrame→stop =TRUE is performed before the routine HandlePictureAtDecoder( ) is called, the stop ==TRUE flag may prevent any pictures from being decoded. For STOP_ON_DECODE requests, the CurrentPictureHeader global structure that contains the parsed out AUX FIFO memory information is generally checked. If the frame referenced via the pointer CurrentPictureHeader global structure picture type matches the stop_pic parameter, the stop command is generally presented. The stop_Pic command may be implemented similarly to the STOP_ON_DISPLAY command. The stop_pic command may be presented before the command HandlePictureAtDecoder( ) is called such that the stop ==TRUE flag may prevent any further pictures from being decoded. The command FFDStopDecode( ) may be implemented as a request and not an instantaneous command. As such, the application where the process 100 is implemented generally polls the stop process status via calling the command FFDDecodeStopped( ) until FFDDecodeStopped( ) returns TRUE. At that point data-destructive operations such as channel resets in the decoder 110 may be performed safely.

Figure 8:
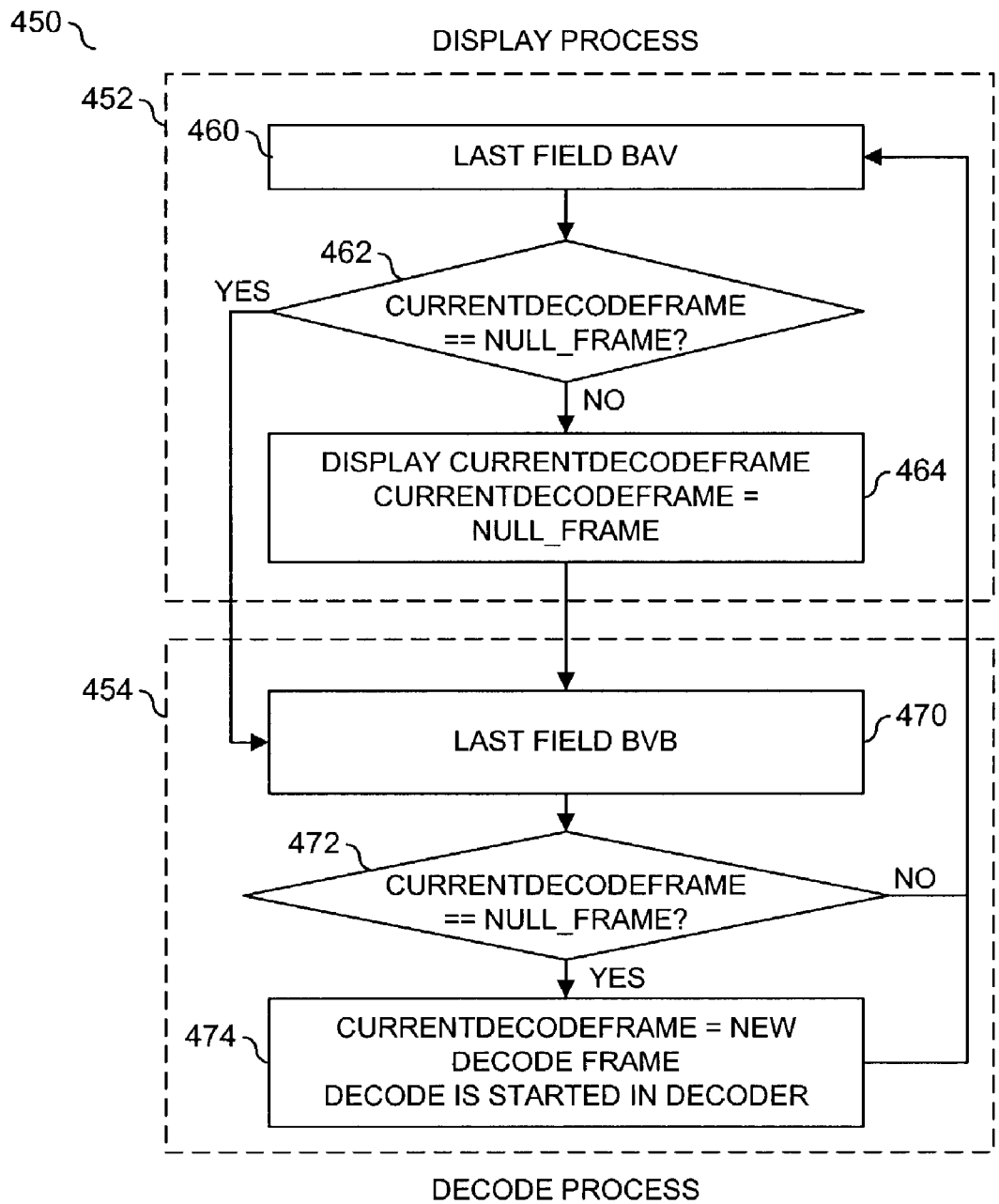
FIG. 8 is a flow diagram of an interaction process in accordance with the present invention.

Referring to FIG. 8, a flow diagram 450 illustrating a display/decode process of the present invention is shown. The process 450 may be implemented as an interaction of a display process 450 and a decode process 454. The frame display update decision tree 400 may be implemented to determine whether or not the currently displaying frame needs to be repeated. Upon entry to the last field BAV (e.g., the block 104), the pointer NextDisplayFrame may be set to NULL_FRAME. The pointer NextDisplayFrame may be set to a valid frame store pointer during a frame change situation. The valid frame may be implemented as a B frame display (e.g., the video image B_IMAGE that corresponds to the block 120)) or a backward anchor display (e.g., the video image ANCH_IMAGE that corresponds to the block 124). As such, the FFD engine 100 may implement the pointer NextDisplayFrame as a signal to enter a repeat. When the pointer NextDisplayFrame ==NULL_FRAME, no picture was set up for display in the decoder 110 display controller, therefore, a repeat is generally enabled.

The display process 452 and the decode process 454 of the method 100 may be configured to operate more or less independently. The method 100 may provide one system global (e.g., bridge) that ties the display and decode processes together. The structure pointer CurrentDecodeFrame is generally implemented as the system global bridge between the decode process 454 and the display process 452. The CurrentDecodeFrame pointer may correspond to the location where the decode process assigns the frame store that the decoder 110 is decoding and CurrentDecodeFrame may correspond to the pointer that the display process 140 implements to display the frame. The decode process 454 and the display process 452 may depend on each other for properly setting and clearing the pointer CurrentDecodeFrame. When the decode process 454 does not assign a frame store to the pointer CurrentDecodeFrame, the display process 452 portion of the method 100 may stall because there may not be a portion to display. If the display process 452 does not remove the frame at the pointer CurrentDecodeFrame, the decode process 454 may stall because there may not be a place (block) to decode into. The FFD engine 100 generally relies on the pointer CurrentDecodeFrame to perform as a bridge such that the display and decode processes 452 and 454 regulate each other.

The display process 452 generally comprises a state (or block) 460, a decision state (or block) 462, and a state (or block) 464. The decode process 454 generally comprises a state (or block) 470, a decision state (or block) 472, and a state (or block) 474. The state 460 may be configured as a last field BAV. In one example, the last field BAV state 460 may correspond to the state 104. The process 450 may be configured to continue to the decision state 462.

The decision state 462 may be configured to determine whether or not the pointer CurrentDecodeFrame ==the value NULL_FRAME. When the pointer CurrentDecodeFrame does not ==the value NULL_FRAME, the method 450 may be configured to transition to the state 464. The state 464 may be configured to (i) display the frame that corresponds to the pointer CurrentDecodeFrame (e.g., via the frame store 140) and (ii) set the pointer CurrentDecodeFrame equal to the value NULL_FRAME. The method 450 may continue to the state 470 in the decode process 454.

The state 470 may be configured as a last field BVB. In one example, the state 470 may correspond to the state 102. The process 450 may be configured to continue to the decision state 472.

The decision state 472 may be configured to determine whether or not the pointer CurrentDecodeFrame ==the value NULL_FRAME. When the pointer CurrentDecodeFrame ==the value NULL_FRAME, the method 450 may be configured to transition to the state 474. The state 474 may be configured to set the pointer CurrentDecodeFrame =a new decode frame (e.g., the frame corresponding to the frame store 130) and a new decode process may be initiated via the decoder 110 (e.g., the state 132). The method 450 may be configured to return to the state 460 in the display process 452. Returning to the decision state 462, when the pointer CurrentDecodeFrame ==the value NULL_FRAME, the method 450 may be configured to transition to the state 470. Returning to the decision state 472, when the pointer CurrentDecodeFrame does not ==the value NULL_FRAME, the method 450 may be configured to transition to the state 460 in the display process 452.

In one example, a primitive command that may interact adversely with the four frame decode process of the method 100 may be replaced with a four frame substitute command that may be configured to perform substantially the same function as the primitive command. However, the method 100 may not necessarily be implemented having a one-to-one mapping for the primitive command to the substitute command.

In one example, the following primitive commands may be substituted and/or modified via an implementation of the process 100. Commands skip( ) and repeat( ) may be performed under the coordination of the four frame decode core (e.g., the routine 100 may be configured to track the images that have been decoded). The commands skip( ) and repeat( ) may be mapped to the commands FFDSkipFrame (frameType, MODE) and FFDRepeatFrame(MODE). The command FFDRepeatFrame (MODE) may be configured to repeat either (i) continually (e.g., CONTINUOUS), (ii) as a one shot of both fields of a progressive frame (e.g., ONE_SHOT), or (iii) as the last field (not shown) of an interlaced frame (e.g., OFF). In one example, display override of the last field may not be supported in the decoder 110. Instead, the process 100 may be configured to add one line to the frame store base addresses (not shown) to generate a display override on the last field.

The command displayOverride( ) may be prohibited when the system 100 is implemented since the system 100 is generally implemented in the four frame decode core (not shown). The command displayOverride( ) may be mapped to an override command FFDDisplayOverride(overrideStruct). When the method 100 is implemented, (i) users may be discouraged from exercising the command FFDDisplay-Override(overrideStruct) and (ii) one or more automatic mechanisms of override during channel change and picture insertion may be implemented. Similarly, the command ripForward( ) may be substituted with the command FFD-RipForward( ). However, (i) users may be discouraged from exercising the command FFDRipForward( ) and (ii) and the command ripForward( ) may be eliminated.

Since the command freezeField( )/freezeFrame( ) generally affects the field generation process (e.g., stops a transition from a first field to a last field), the command freezeField( )/freezeFrame( ) may be substituted with the command FFDRepeatFrame(CONTINUOUS). The command FFDRepeatFrame(CONTINUOUS) may be configured to repeat either the frame or last field continuously in response to the structure of the respective frame. Frame store base address register programming may be implemented via the routine 100. The routine 100 may be provided with the base addresses of four frame stores via the command FFD-SetFrameStoreBaseAddresses(addresses[8]).

In one example, a command automaticFieldInversionCorrection( ) may be enabled. However, in a preferred embodiment of the system 100, field inversions may be implemented in the four frame decode system via a command FFDAutomaticFieldInversionCorrection( ). The command startDecode( ) may be replaced with a command FFDStartDecode( ). The command stopDecode( ) may be replaced with a command FFDStopDecode( ). Sequence end processing may be implemented via the system 100. The system 100 may be configured to implement access to all appropriate decode and display features.

In one example, the decode and display commands may be implemented as follows:

1. The command FFDStartDecode( ) may be configured to remove a decode disable.
2. The command FFDStopDecode( ) may be configured to stop decode at a first slice of a subsequent picture. However, when a subsequent picture is the second field picture in the frame, the command FFDStopDecode( ) may be configured to decode the next field picture before stopping. A status signal (not shown) may be presented (and read) to indicate that decode has actually stopped.
3. The command FFDResetDecode(resetStruct) may be configured to deallocate three of the frame stores. However, the frame store that holds the last displayed picture (e.g., the store 120 or the store 124) is generally maintained.
4. The command FFDSkipFrame(frameType, MODE) may be configured to skip a frame of the requested type (e.g., B, I, P, etc.). The parameter MODE may be implemented as ONE_SHOT, CONTINUOUS or OFF.
5. The command FFDRepeatFrame(MODE) may be configured to repeat the current frame (or last field). The parameter MODE may be implemented as ONE_SHOT, CONTINUOUS or OFF. The command FFDRepeatFrame (MODE) will generally be active for an even number of fields to preserve correct (proper) field synchronization.
6. The command FFDSetFrameStoreBaseAddresses(addresses[8]) may be configured to set up all frame store addresses. In one example, eight addresses are generally passed (transferred) (e.g., four addresses for luma and four addresses for chroma). The function generally implemented via the command FFDSetFrameStoreBaseAddresses(addresses [8]) may be implemented via the command FFDResetDecode.
7. The command FFDForceAnchorDisplay( ) may be configured to force display of any decoded anchor frames (e.g., the blocks 122 and/or 124) that are undisplayed.

When the system 100 is implemented, the user may be discouraged from implementing the following commands:

1. The command FFDDisplayOverride(overrideStruct) may be configured to pseudo override a display to a user frame store in response to members of the parameter overrideStruct.
2. The command FFDRipForwardMode( ) may be configured to provide a pseudo rip forward mode.
3. The command FFDRipForward( ) may be configured to provide pseudo rip forward.

The method 100 may be configured to implement a number of modes of operation. The method 100 may be configured to provide (or maintain) audio/video synchronization. When the commands FFDSkipFrame(frameType, MODE) and FFDRepeatFrame(MODE) are implemented, frames may be skipped or repeated. Display of a frame (e.g., the state or block 140) generally lags a respective display in an ideal MPEG decoder by one frame. When the system 100 affects audio/video synchronization calculations, the audio/video synchronization calculations are generally modified (e.g., such that audio/video synchronization is maintained) to meet the design criteria of the particular application.

During a channel change operation implemented via the routine 100, the decode will generally be stopped via the command FFDStopDecode( ). The command FFDResetDecode( ) function may be exercised to ensure that the last displayed picture is frozen on the screen (not shown) and that the frame store allocation system (not shown) is reset. Decode may be restarted at an appropriate time via the command FFDStartDecode( ) function. Resetting the video channel and searching for the next sequence header (not shown) may proceed similarly to a conventional decode system.

Decode may be stopped via the command FFDStopDecode( )during a picture insertion operation implemented via the process 100 similarly to the channel change operation. The command FFDResetDecode( ) function may be implemented to maintain the current display frame store (e.g., the state 140) during a resetting of the other frame stores (e.g., the states 120, 122, and/or 124). The method 100 may be configured such that any decoded anchor frames (e.g., the blocks 122 and/or 124) that have not been displayed will not appear (e.g., may not be displayed).

When the picture data has been placed into the video buffer (not shown), decode may be started again via the command FFDStartDecode( ) function. The command FFDForceAnchorDisplay( ) command may be implemented to force display of the still pictures when pictures are inserted individually (or for the last picture). However, the tag NULL_FRAME may also be configured to force display of an anchor frame 122 and/or 124 that has not been displayed.

The process 100 may be configured as a frame store management module (e.g., the process 100 may be implemented via software, firmware, hardware, and/or any combination thereof). The process 100 may be implemented as a four frame decode configured to provide arbitrary scaling of images. The process 100 may be configured to ensure that decode and display do not simultaneously operate out of the same frame store. The process 100 may be configured to provide for decode to progress at full pace (e.g., operate at full speed) without the possibility of overwriting the previous image.

The four (or greater) frame decode implemented via the method 100 may be configured having a frame store management routine that is different than a conventional (e.g., three frame) frame store management routine. The method 100 may be configured having frame store allocation and release timing that differs from conventional three frame store decode timing. In addition, unlike conventional three frame decode, frame stores implemented via the method 100 (e.g., the circuit 112) are not generally associated with a fixed picture type (e.g., anchor video images or B video images).

A primary attribute of a frame store management routine (e.g., the method 100) is that frame stores are generally released after the images contained therein are no longer necessary for prediction (e.g., anchor frames) and are no longer needed for display (e.g., anchor frames and B frames). The frame store management routine 100 is generally also configured to allocate frame stores for the decode of incoming pictures.

In one example, a sequence of frames may be implemented via the process 100 as shown in TABLE 1.

disallow decode and display from the same frame store. Display of a B frame (e.g., the state 120) via the state 140 generally follows a respective decode (e.g., the state 112) by one frame period. Display of an anchor frame (e.g., the block 124) via the state 140 generally follows the decode of the respective following anchor frame by one frame period. For the example of both anchor frames and B frames, the frames are generally displayed in the order of decoding. The two most recent anchor frames are generally resident (e.g., via the states 122 and 124) to provide for B frame predictions to be generated.

The process 100 may be configured such that an image in a B frame (e.g., the video image B_IMAGE that corresponds to the state 120) is displayed (e.g., the state 140) prior to the release of the B frame store. The image in an anchor frame (e.g., the video image ANCH_IMAGE that corresponds to the state 124) is generally displayed and there are generally no further prediction dependencies on the anchor frame 124 prior to the release of the anchor frame store (e.g., to the free frame store 130 as the signal FREE_FRAME). In one example, the process 100 may be configured such that at least three anchor frame stores are resident (e.g., via the states 120, 122, and 124). In another example, the process 100 may be configured such that two anchor frames are resident (e.g., via the states 122 and 124) and the incoming picture is another anchor picture (or the tag NULL_FRAME). In any case, the process 100 is generally configured such that prediction is properly implemented.

Frame stores are generally classified as displayed when the display state 140 is about to move to (e.g., receive) the subsequent frame store. Thus, when no following frame store exists (e.g., the blocks 120 and 124 are NULL), no matter how many times a frame is actually displayed, the display frame is not generally processed as a displayed frame and may not be released.

The decoder 110 that is configured in connection with the method 100 may be implemented having two field status bits (not shown) that are configured to coordinate the display process (e.g., the state 140). The status bits are generally implemented as top/bottom field and first/middle/last field status bits. The top/bottom field status bit is generally configured to indicate at any point in time whether the top field or bottom field of the frame is being displayed. The top/bottom field status bit may be configured to toggle between top and bottom fields in a well constructed video stream. However, under certain conditions (e.g., when a video stream contains slice errors, missing headers, etc.) the top/bottom field status bit may not toggle.

The first/middle/last field status bit may be configured to indicate at any point in time whether the first, middle or last field of the current display frame is being displayed. The first/middle/last field status bit may be important for many of the display parameters and commands since many of the

TABLE 1

| FRAMES | 1 | 2 | 3 | 4 | 5 | 6 | 7 | 8 | 9 | 10 | 11 | 12 | 13 | 13 |
|---|---|---|---|---|---|---|---|---|---|---|---|---|---|---|
| DECODE | I0 | P0 | B0 | B1 | P1 | B2 | B3 | P2 | B4 | B5 | P3 | B6 | B7 | ... |
| DISPLAY | — | — | I0 | B0 | B1 | P0 | B2 | B3 | P1 | B4 | B5 | P2 | B6 | B7 |

The sequence of frames shown in TABLE 1 generally corresponds to a fixed relationship between decode and display operations (or functions) (e.g., the processes 454 and 452). The fixed relationship between decode 454 and display 452 may be forced by a four frame decode routine such as the process 100. The process 100 may be configured to display parameters and commands are generally sampled relative to the edges of the first/middle/last field status bit.

Since the process 100 is generally implemented having the rip forward and display override modes of the decoder 110, four frame decode may be implemented via manual manipulation of the top/bottom field and first/middle/last field status bits. The top/bottom field and first/middle/last field status bit signals may be manipulated via CPU top field first and CPU repeat first field control bits (not shown) in a Decoder Freeze Field Control (DFFC) register (not shown). An odd/even field status bit (not shown) is generally automatically controlled and configured to toggle on every field via a display controller (not shown) within the decoder 110.

When the CPU repeat first field control bit is set, display of the next frame generally comprises three fields (e.g., the first, middle, and last fields). Otherwise the display of the next frame generally comprises two fields (e.g., the first and last fields). The CPU top field first control bit generally specifies whether the top or bottom field of the frame is output first to the display block 140. The CPU top field first and CPU repeat first field control bits may be sampled on the boundary between the last and first field. The CPU top field first and CPU repeat first field control bits and the top/bottom field and first/middle/last field status bits may have a circular dependancy.

Since the CPU top field first and CPU repeat first field control bits are sampled at the boundary between the last and first field, the CPU top field first and CPU repeat first field control bits are generally programmed with the values of the top field first and repeat first field bits of the picture that is to be displayed at the start of the next first field. An appropriate point to set up the CPU top field first and CPU repeat first field control bits may be on the begin vertical blank (BVB) interrupt on the last field (e.g., in response to the signal BVB_INT).

Display of the top field of an image may be configured to map to the odd raster of a phase alternation by line (PAL) or National Television System Committee (NTSC) display. Since decode generally starts on an arbitrary ODD/EVEN field (not shown) and other circumstances (e.g., channel change, edited stream, etc.) may lead to an improper mapping, a recovery method (routine, process, etc.) that may be implemented in connection with the process 100 to insert a pulldown when a signal (e.g., RepeatFirstField) =1 or remove a pulldown when the signal RepeatFirstField =0 to restore the proper mapping.

The process 100 may be configured to provide a display module (e.g., the block 452). Decode (e.g., the block 454) is generally configured in response to a frame rate of the display. In one example, only one frame may be decoded per frame period. The decode 454 may be configured to provide (i) frame decode, (ii) additional graphics, (iii) video scaling (e.g., arbitrary vertical and/or horizontal scaling), and/or (iv) post-decode display controller processes (not shown). However, in another example alternative decode per frame period rates (e.g., less than a single frame time period) may be implemented via the process 100 to meet the design criteria of a particular application.

Display parameters may be set up in the LAST FIELD at BVB ready for the presentation of the frame at the beginning of the first field. When a signal (e.g., RepeatFrame) is active or no further valid frame stores are available for transfer to the block 140 (e.g., the blocks 120 and 124 contain the NULL value), the display of the current frame/last field may be repeated.

The method 100 may be configured to check for a valid frame store for transfer via the following steps:

1. If the last decoded frame was implemented as a B frame (e.g., the frame 120), the last decoded frame may be implemented as the next display frame (e.g., the frame 140).

2. If the last decoded frame was implemented as an anchor frame (e.g., the frame 124) and one other undisplayed anchor frame exists (e.g., the frame 122), the other undisplayed anchor frame may be implemented as the next display frame (e.g., the frame 140).

3. If a tag NULL_FRAME has been detected in the decoder and the last decoded frame was not implemented as a B frame, the decoded but undisplayed anchor frame (e.g., the block 122) may be implemented as the next display frame.

4. If the tag NULL_FRAME has been detected in the decoder and the last decoded frame was implemented as a B frame (e.g., the frame 120), display of the decoded B frame may be repeated. Repeating the display of the B frame may obviate potential frame skips that may adversely affect audio/video synchronization.

If open group of picture (GOP) and broken link indications (not shown) are set during decode, the initial contiguous B frames following the GOP header may be skipped by the decoder 110 and display may remain on the currently displayed frame until the next valid frame is decoded. The B frames B_IMAGE are generally skipped one per frame period time in order to maintain correct (proper) buffering levels and decode timing. The B frame skipping is generally hidden within the video decoder 110 microcode (not shown).

Display parameters may be sampled on each new field via the display controller (not shown) operating in a display override mode. A number of display parameters (e.g., override luma base address, override chroma base address, override picture width, horizontal pan scan offset, and/or override frame/first field) may be implemented to specify an image (not shown). All of the display parameters (or signals) except horizontal pan scan offset are generally modified once per frame. The horizontal pan scan parameter may be modified on a field basis.

Horizontal pan scan offsets are generally coded in the Picture Display Extension (not shown). Picture Display Extensions are generally not mandatory. When no pan scan offsets are coded for a picture, the most recently coded pan scan offsets may be implemented. A Sequence Header (not shown) may be configured to reset the most recently coded pan scan offsets to zero. The process 100 may be configured to implement full display parameter functionality.

When a command RepeatFrame is executed on a progressive frame, both the top and bottom fields of the frame may be displayed alternately. When a command RepeatFrame is executed on an interlaced frame, the last field may be displayed continuously. When there are no further frame stores to display, the system 100 may be configured to operate similarly to operation when the command RepeatFrame is executed. When the method 100 operates in a repeat frame mode, pan scan vectors (not shown) may be programmed per field for a progressive image. Two or three vectors may be associated with the progressive frame in response to the value of a signal (e.g., REPEAT_FIRST_FIELD).

A number of API functions (or commands, signals, etc.) (e.g., FFDRepeatFrame(MODE), FFDForceAnchorDisplay( ), and/or FFDDisplayOverride(overrideStruct)) that correspond to the display module may be implemented via the process 100. The command FFDRepeatFrame (MODE) may be configured to repeat the current frame (or last field). The parameter MODE may be implemented as ONE_SHOT, CONTINUOUS or OFF. The command FFDRepeatFrame (MODE) may be active for an even number of fields to ensure correct field synchronization. The command FFDForceAnchorDisplay( ) may be configured to force a display of any decoded but undisplayed anchor frames (e.g., the video image ANCH_IMAGE frames 122 and 124). The command FFDDisplayOverride(overrideStruct) may be configured to pseudo override a display to user frame store in response to overrideStruct members (not shown).

The process 100 may implement a decode (e.g., the decode 454) that may proceed in lock step (e.g., may be synchronous) with display (e.g., the display 452) to simplify the system. Picture data is generally collected from the AUX FIFO and added to descriptors (not shown) associated with the frame store that the picture was decoded into. Picture data may be configured to provide suitable display settings prior to the display of the frame (e.g., the state 140).

When a first slice start code (not shown) of the type that corresponds to the picture to be decoded is received, the code will generally be read and a request will generally be generated for an available frame store (e.g., from the block 134). If a frame store is available, decode will generally proceed. Otherwise decode may stall until a frame store is available. If the pictures that comprise a frame are field coded, only one frame store may be requested and the second field of the frame generally has no contingency configured to stop decode. Decode may commence if at least one frame picture or two field pictures are present in a video elementary stream buffer (not shown). A panic mode (not shown) is generally disabled for the video decoder where the method 100 is implemented.

Closed GOP and broken link flags (not shown) are generally read and acted upon via the decoder microcode (not shown) and are generally not overrideable. In one example, the first sequence of B pictures (e.g., one or more video images B_IMAGE) following the GOP header may be discarded by the decoder 110. Discarding the first sequence of B pictures may be transparent to the decode module implemented via the process 100. However, the picture data for the discarded B pictures may be available via the AUX FIFO. The decode module implemented via the method 100 is generally configured to acknowledge that the discarded B pictures have not been decoded. The acknowledgment may be implemented via seeding the frame store before decode with a random tag (not shown) and detecting that the tag is subsequently overwritten (described in connection with FIGS. 5 and 7(a–b)).

The process 100 may be configured to implement a number of API functions (or signals, commands, etc.) (e.g., FFDStartDecode( ), FFDStopDecode( ), FFDResetDecode (resetStruct), FFDSkipFrame (frameType, MODE), FFDSetFrameStoreBaseAddresses(addresses[8]), FFDRipForwardMode( ), FFDRipForward( ), and/or FFDInitializeDecode( )) that generally correspond to the decode module 454. The command FFDStartDecode( ) may be configured to remove the disable of the decode. The command FFDStopDecode( ) may be configured to stop decode at the first slice of the next picture unless the next picture is the second field picture in the frame. When the next picture is the second field picture in the frame, the function FFDStopDecode( ) may be configured to decode the next field picture before stopping. A status bit (not shown) may be set (and read) to indicate that decode has actually stopped.

The function FFDResetDecode(resetStruct) may be configured to deallocate three of the frame stores. However, the frame store 120 or 124 that holds the last displayed picture is generally maintained. The signal FFDSkipFrame (frameType, MODE) may be configured to skip a frame of the requested type. The parameter MODE may be ONE_SHOT, CONTINUOUS or OFF. The command FFDSetFrameStoreBaseAddresses(addresses[8]) may be configured to set up all frame store addresses (not shown). Eight addresses are generally passed (or transmitted). Four addresses may be configured to correspond to luma and four addresses may be configured to correspond to chroma. The function (or command) FFDSetFrameStoreBaseAddresses(addresses[8]) may be implemented via the function FFDResetDecode. The command FFDRipForwardMode( ) may be configured to implement a pseudo rip forward mode. The command FFDRipForward( ) may be configured to implement a pseudo rip forward. The command FFDInitializeDecode( ) may be configured to reset the decode FIFOs (e.g., the blocks 130 and 134) and initialize variables (e.g., MODE, etc.). While the system 100 has been described in connection with a number of commands (functions, routines, features, signals, modes, instruction sets, etc.) (e.g., FFDRipForwardMode( ), FFDRipForward( ), FFDInitializeDecode( ), etc.) that may be implemented in a number of video decoders, the system 100 may be implemented having any type and/or number of appropriate commands to meet the design criteria of a particular application.

The process 100 may be configured to implement an error module (not shown). The error module may be configured to determine (or detect) inconsistent state combinations that may indicate that the process 100 is failing. In one example, the error module implemented via the process 100 may be configured to provide debug capabilities. In another example, the error module implemented via the process 100 may be configured to initiate remedial action to recover from the detected errors. The system 100 may be configured to provide error recovery and operational stability (e.g., ensure that an error only has a finite influence on the system 100). The system 100 may encounter sources of error that may include underflow, improper AUX FIFO parsing, and/or non-compliant bitstreams (e.g., bitstreams having slice errors, missing picture headers, etc.).

In one example, the system 100 may be configured to display a sequence of video frames at an initial startup condition. The initial startup frame sequence may be implemented as follows:

I1 P1 B1 B2 P2 B3 B4

The initial startup frame video display sequence (e.g., steps) implemented via the process 110 may be as shown in TABLE 2.

TABLE 2

| | CURRENT DECODE FRAME 134 | CURRENT DISPLAY FRAME 140 | B FRAME 120 | FORWARD ANCHOR 122 | BACKWARD ANCHOR 124 |
| --- | --- | --- | --- | --- | --- |
| Step 1 | I1 | NULL | NULL | NULL | NULL |
| Step 2 | P1 | NULL | NULL | I1 | NULL |
| Step 3 | B1 | I1 | NULL | P1 | I1 |
| Step 4 | B2 | B1 | B1 | P1 | I1 |
| Step 5 | P2 | B2 | B2 | P1 | I1 |
| Step 6 | B3 | P1 | NULL | P2 | P1 |
| Step 7 | B4 | B3 | B3 | P2 | P1 |

In another example, the system 100 may be configured to display a sequence of video frames at a continued decoding condition. The continued decoding frame sequence may be implemented as follows:

. . . I1 B1 B2 P1 B3 B4 . . .

The continued decoding frame video display sequence (e.g., steps) implemented via the process 100 may be as shown in TABLE 3.

TABLE 3

| | CURRENT DECODE FRAME 134 | CURRENT DISPLAY FRAME 140 | B FRAME 120 | FOR-WARD ANCHOR 122 | BACK-WARD ANCHOR 124 |
|---|---|---|---|---|---|
| Step 1 | I1 | X | X | X | X |
| Step 2 | B1 | PREVIOUS FORWARD ANCHOR 122 | X | I1 | X |
| Step 3 | B2 | B1 | B1 | I1 | X |
| Step 4 | P1 | B2 | B2 | I1 | X |
| Step 5 | B3 | I1 | NULL | P1 | I1 |
| Step 6 | B4 | B3 | B3 | P1 | I1 |

In yet another example, the system 100 may be configured to display a sequence of video frames at an initial still picture condition. The initial still picture frame sequence may be implemented as follows:

I1 NULL_FRAME

The initial still picture frame video display sequence (e.g., steps) implemented via the process 100 may be as shown in TABLE 4.

TABLE 4

| | CURRENT DECODE FRAME 134 | CURRENT DISPLAY FRAME 140 | B FRAME 120 | FOR-WARD ANCHOR 122 | BACK-WARD ANCHOR 124 |
|---|---|---|---|---|---|
| Step 1 | I1 | NULL | NULL | NULL | NULL |
| Step 2 | NULL_ FRAME | NULL | NULL | I1 | NULL |
| Step 3 | NULL | I1 | NULL | NULL_ FRAME | I1 |
| Step 4 | NULL | I1 | NULL | NULL_ FRAME | I1 |

In yet another example, the system 100 may be configured to display a sequence of video frames at a sequence end ignored condition. The sequence end ignored frame routine may be implemented as follows:

. . . I1 B1 P1 B2 NULL_FRAME I2 P2 B3 . . .

The sequence end ignored frame video display sequence (e.g., steps) implemented via the process 100 may be as shown in TABLE 5.

TABLE 5

| | CURRENT DECODE FRAME 134 | CURRENT DISPLAY FRAME 140 | B FRAME 120 | FOR-WARD ANCHOR 122 | BACK-WARD ANCHOR 124 |
|---|---|---|---|---|---|
| Step 1 | I1 | X | X | X | X |
| Step 2 | B1 | PREVIOUS FORWARD ANCHOR | X | I1 | X |
| Step 3 | P1 | B1 | B1 | I1 | X |
| Step 4 | B2 | I1 | NULL | P1 | I1 |
| Step 5 | NULL_ FRAME + I2 | B2 | B2 | P1 | I1 |
| Step 6 | P2 | P1 | NULL | I2 | P1 |
| Step 7 | B3 | I2 | NULL | P2 | I2 |

In one example, the system 100 may be configured to display a sequence of video frames at a next sequence delayed condition. The next sequence delayed frame sequence may be implemented as follows:

. . . I1 B1 P1 B2 NULL_FRAME . . . I2 P2 B3 . . .

The next sequence delayed frame video display sequence (e.g., steps) implemented via the process 100 may be as shown in TABLE 6.

TABLE 6

| | CURRENT DECODE FRAME 134 | CURRENT DISPLAY FRAME 140 | B FRAME 120 | FOR-WARD ANCHOR 122 | BACK-WARD ANCHOR 124 |
|---|---|---|---|---|---|
| Step 1 | I1 | X | X | X | X |
| Step 2 | B1 | PREVIOUS FORWARD ANCHOR | X | I1 | X |
| Step 3 | P1 | B1 | B1 | I1 | X |
| Step 4 | B2 | I1 | NULL | P1 | I1 |
| Step 5 | NULL_ FRAME | B2 | B2 | P1 | I1 |
| Step 6 | NULL | P1 | NULL | NULL_ FRAME | P1 |
| Later (e.g., after the delay) | | | | | |
| Step 7 | I2 | P1 | NULL | NULL_ FRAME | P1 |
| Step 8 | P2 | P1 | NULL | I2 | P1 |
| Step 9 | B3 | I2 | NULL | P2 | I2 |

The method 100 may be configured to provide a test harness (not shown) to ensure the exercising of a number of functions and/or observations to measure and/or determine potential logical errors. The routine 100 may be configure to provide a complete code walk through. The system 100 may implement a test simulator (not shown) configured to provide simulation of the system 100 via user defined stream characteristics. The decode process 454 and the display process 452 of the stream with associated frame store allocation information may be traced via the simulator. Challenging streams (e.g., corner cases) may be evaluated via the simulator and the simulator output (not shown) may be observable.

In one example, the method 100 may be configured to provide testing of traditional GOP structures, esoteric GOP structures, a typical startup conditions, broken links, sequence end codes, progressive sequences, and/or other appropriate test conditions to meet the design criteria of a particular application. System level testing of the system 100 may be configured to provide for running selected streams from a library of streams (not shown) and observing and/or measuring the corresponding results. In one example, one or more stages of the testing of the system 100 may be configured to provide two STBs (not shown) to implement side by side comparison. One of the STBs may be configured to run a conventional three frame store mode and the other STB may be configured to run the four frame store mode of the present invention (e.g., the routine 100). Testing of the system 100 may be configured to provide vigorous exercising of channel change and/or picture insertion operations. Testing of the system 100 may be configured to provide bitstreams with errors (e.g., bitstreams having slice errors, missing picture headers, etc.) to ensure that the system 100 detects and/or recovers from errors.

In a preferred embodiment, the present invention may implement a multi-frame video display system that may be configured to operate exclusively in a four frame mode. However, in an alternative embodiment the system 100 may be configured to alternate operation between the four frame mode and a three frame mode. When the present invention is configured to alternate operation between the four frame mode and the three frame mode, the present invention may operate with less risk due to less operating time in the four frame mode and more time in the three frame mode. The operation configured to alternate between the four frame mode and a three frame mode may limit a worst case propagation of errors to the four frame/three frame boundary.

The process 100 may be configured to support arbitrary vertical scaling and/or provide sufficient time to do various additional graphics manipulation after a picture has been decoded. Adding one or more frame stores to the video display system via the four or more frame process 100 may overcome the deficiencies of conventional three frame systems that are configured to decode and display from the same frame store simultaneously. The present invention may be configured to implement four or more frame decode in connection with display control and decode control features that are implemented in a number of currently available decoders. However, the present invention may be configured to implement four or more frames via any appropriate features, commands, instruction sets, routines, modes, etc. to meet the design criteria of a particular application.

The method 100 may be implemented as a modular process that may be simple to port. The present invention may be easily understood by typical users. The process 100 may be configured to be tested extensively. The routine 100 may be extendable to implement a manual three frame decode operation. The present invention may be implemented having full feature availability and support (e.g., horizontal pan scan, pulldown, channel change, picture insertion, display override, rip forward, etc.).

The method 100 may be incrementally released. The present invention may be fault tolerant and stable. The system 100 may be configured to provide (i) 100% performance under normal conditions and (ii) concealment and recovery under abnormal conditions such as underflow, bitstream errors, etc. The method 100 may implement monitoring facilities and/or error traps. The present invention may be developed rapidly and quickly marketed. The method 100 may be transparent to the video display application. The method 100 may be configured to provide easy mapping of primitive commands (e.g., via substitute commands that are configured to perform substantially the same function as the primitive commands).

The present invention may be implemented as a core running in the background (not shown) and a set of overridden primitive commands (e.g., the commands skip( ), repeat( ), etc.) that may be configured to manipulate the core. The routine 100 may be configured to be compatible with a number of decoder drivers via hooks. The routine 100 may be configured to provide post-decode graphics engines (not shown) that may be implemented to complete any processing and/or effects that are desired before the picture data (image) is displayed on a monitor (not shown). In one example, the present invention may be implemented having four frames. However, the present invention may be scaled to hold any number of decoded pictures (e.g., implemented with any appropriate number of unused frame and decode frame stores/pools 130, 132, and/or 134) to provide sufficient time for slower post-decode graphics engines to perform. In one example, the present invention may be implemented in the connection with a set-top-box (STB) decoder. However, the present invention may be implemented in connection with any appropriate video decoder to meet the design criteria of a particular application.

The present invention may be configured to implement delay via existing hardware and/or existing hardware microcode (not shown) with minimal changes to software and API. The system 100 may be configured to control the store pools (e.g., the circuits 130 and/or 134) such that audio/video synchronization and/or trick modes are not affected. The method 100 may be configured to decode all significant compliant bitstreams.

In one example, the process 100 may be configured to delay the frame that is to be displayed by a frame period time, such that decode processing may be performed. Decode processing (e.g., via the state 112) may comprise (i) decoding the unused frame store (e.g., decoding the frame store 132), (ii) additional graphics, (iii) video scaling (e.g., arbitrary vertical and/or horizontal scaling), and/or (iv) performing post-decode display controller processes (e.g., via one or more decode engines coupled to the store 132). The present invention may be implemented at a significantly lower cost than conventional faster speed hardware graphics solutions. The present invention may be configured to provide full video scaling that has significant value to users.

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, flash memory, magnetic or optical cards, or any type of media suitable for storing electronic instructions.

The present invention has been described in connection with illustrative commands, instruction sets, programming syntax, etc. However, the present invention may be implemented having any appropriate commands, routines, instruction sets, programming language, etc. implemented via software, firmware, hardware, and/or any combination thereof to meet the design criteria of a particular application.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a decode frame store configured to decode one or more free frames and generate one or more B video images and one or more anchor video images;
   a B frame store configured to receive said one or more B video images from said decode frame store;
   a first anchor frame store configured to receive said one or more anchor video images from said decode frame store; and
   a second anchor frame store configured to receive said one or more anchor video images from said first anchor frame store, wherein said apparatus further comprises one or more post-process decode engines coupled to said decode frame store and configured to generate said one or more B and said one or more anchor video images provide (i) additional graphics, (ii) video scaling, and (iii) post-decode display controller processes.

2. The apparatus according to claim 1, wherein said decode frame store comprises (i) an unused frame store configured as a free frame pool configured to store said one or more free frames, (ii) a decoding frame store configured to generate said one or more B video images and said one or more anchor video images in response to said one or more free frames, and (iii) a decoded frame store configured as a decoded frame pool configured to store said one or more B video images and said one or more anchor video images.

3. The apparatus according to claim 2, wherein said unused frame store and said decoded frame store each comprise one or more first-in/first-out (FIFO) memories.

4. The apparatus according to claim 2, wherein said apparatus further comprises a display frame configured (i) to receive said B video images from said B frame store in a first mode of operation and said anchor video images from said second anchor frame in a second mode of operation and (ii) to display a current video image in response to said B and anchor video images.

5. The apparatus according to claim 4, wherein said apparatus is configured to provide a delay time that is less than or equal to a single frame time period between decoding said one or more free frames and displaying said current video image.

6. The apparatus according to claim 4, wherein said display frame is further configured to present a previously displayed video image to said unused frame store.

7. The apparatus according to claim 1, wherein said first anchor frame store comprises a forward anchor frame store and said second anchor store comprises a backward anchor frame store.

8. The apparatus according to claim 1, wherein (i) said decode frame store, said B frame store, said first anchor frame store, and said second anchor frame store comprise a four frame decoder, (ii) said B frame store, said first anchor frame store, and said second anchor frame store comprise a three frame decoder with decoding performed in said B frame in response to said one or more free frames, and (iii) said apparatus is configured as said three frame decoder during a first display mode and said four frame decoder during a second display mode.

9. The apparatus according to claim 8, wherein said apparatus is configured as said four frame decoder exclusively.

10. A method for decoding and displaying video images comprising the steps of:
(A) decoding one or more B video images and one or more anchor video images in response to one or more free frames, wherein said decoding comprises (i) storing said one or more free frames in a first decode frame store configured as a free frame pool, (ii) decoding said one or more free frames in a second decode frame store, and (iii) storing said decoded frames in a third decode frame store configured as a decoded frame pool;
(B) presenting said one or more B video images to a B video image store;
(C) presenting said one or more anchor video images to a first anchor video image store; and
(D) transferring said one or more anchor video images from said first anchor video image store to a second anchor video image store.

11. The method according to claim 10, wherein said first decode frame store and said third decode frame store each comprise one or more first-in/first-out (FIFO) memories.

12. The method according to claim 10, wherein sub-step (A-2) further comprises the sub-step of:
decoding said free frames via one or more decode engines coupled to said second decode frame store.

13. The method according to claim 10, wherein step (A) further comprises the sub-step of:
delaying a display operation following said decoding operation by a period having a duration less than or equal to a single frame time period.

14. The method according to claim 10, further comprising the steps of:
retrieving one of said decoded frames from said third decode frame store;
when said decoded frame comprises one of said B video images, displaying said video image; and
when said decoded frame comprises one of said anchor video images, displaying said second anchor video image store.

15. The method according to claim 14, further comprising the steps of:
operating as a three frame decoder during a first display mode; and
operating as a four frame decoder during a second display mode.

16. The method according to claim 15, further comprising the step of:
operating as said four frame decoder exclusively.

17. An apparatus comprising:
a decode frame store configured to decode one or more free frames and generate one or more B video images and one or more anchor video images;
a B frame store configured to receive said one or more B video images from said decode frame store;
a first anchor frame store configured to receive said one or more anchor video images from said decode frame store; and
a second anchor frame store configured to receive said one or more anchor video images from said first anchor frame store, wherein (i) said decode frame store, said B frame store, said first anchor frame store, and said second anchor frame store comprise a four frame decoder, (ii) said B frame store, said first anchor frame store, and said second anchor frame store comprise a three frame decoder with decoding performed in said B frame in response to said one or more free frames, and (iii) said apparatus is configured as said three frame decoder during a first display mode and said four frame decoder during a second display mode.

* * * * *